US007921707B2

(12) United States Patent
Ishizuka et al.

(10) Patent No.: US 7,921,707 B2
(45) Date of Patent: Apr. 12, 2011

(54) EXHAUST GAS RECIRCULATION DISTRIBUTION VARIATION SENSING DEVICE

(75) Inventors: Koji Ishizuka, Chita-gun (JP); Kenichiro Nakata, Anjo (JP)

(73) Assignee: Denso Corporation, Kariya (JP)

( * ) Notice: Subject to any disclaimer, the term of this patent is extended or adjusted under 35 U.S.C. 154(b) by 141 days.

(21) Appl. No.: 12/258,726

(22) Filed: Oct. 27, 2008

(65) Prior Publication Data

US 2009/0107227 A1 Apr. 30, 2009

(30) Foreign Application Priority Data

Oct. 26, 2007 (JP) ................................ 2007-279639

(51) Int. Cl.
*G01M 15/04* (2006.01)

(52) U.S. Cl. ................ 73/114.74; 73/114.15; 73/114.48

(58) Field of Classification Search ............... 73/114.15, 73/114.48, 114.74

See application file for complete search history.

(56) References Cited

U.S. PATENT DOCUMENTS

| | | | | |
|---|---|---|---|---|
| 6,209,515 | B1 | 4/2001 | Gotoh et al. | |
| 6,314,935 | B2 * | 11/2001 | Tanaka et al. | 123/298 |
| 6,668,795 | B1 * | 12/2003 | Shimada | 123/350 |
| 6,880,524 | B2 * | 4/2005 | Gates et al. | 123/399 |
| 6,981,492 | B2 * | 1/2006 | Barba et al. | 123/568.15 |
| 7,677,092 | B2 * | 3/2010 | Ishizuka et al. | 73/114.45 |
| 2006/0070605 | A1 * | 4/2006 | Akihisa et al. | 123/478 |
| 2007/0175437 | A1 * | 8/2007 | Yamaguchi et al. | 123/294 |
| 2009/0082940 | A1 * | 3/2009 | Ishizuka et al. | 701/103 |
| 2009/0107225 | A1 * | 4/2009 | Ishizuka et al. | 73/114.15 |

FOREIGN PATENT DOCUMENTS

| | | |
|---|---|---|
| JP | 2001-355500 | 12/2001 |
| JP | 2003-148182 | 5/2003 |
| JP | 2003-148199 | 5/2003 |
| JP | 2003-166434 | 6/2003 |
| JP | 2003-314331 | 11/2003 |
| JP | 2004-293486 | 10/2004 |
| JP | 2006-316709 | 11/2006 |

OTHER PUBLICATIONS

U.S. Appl. No. 12/258,750, Koji Ishizuka et al., filed Oct. 27, 2008.
U.S. Appl. No. 11/930,668, Koji Ishizuka et al., filed Oct. 31, 2007.
U.S. Appl. No. 12/179,235, Koji Ishizuka et al., filed Jul. 24, 2008.
U.S. Appl. No. 12/194,130, Kenichiro Nakata et al., filed Aug. 19, 2008.
U.S. Appl. No. 12/197,447, Kenichiro Nakata et al., filed Aug. 25, 2008.

(Continued)

*Primary Examiner* — Freddie Kirkland, III
(74) *Attorney, Agent, or Firm* — Nixon & Vanderhye P.C.

(57) ABSTRACT

An exhaust gas recirculation distribution variation sensing device has a torque sensing section that senses instantaneous torque caused with combustion of fuel injected from an injector for each cylinder, an injection quantity sensing section that senses an actual injection quantity of the injected fuel for each cylinder, and an exhaust gas recirculation distribution variation calculating section that calculates an exhaust gas recirculation distribution variation as a distribution variation of recirculated exhaust gas to respective cylinders based on a variation in the torque sensing value of the torque sensing section among the cylinders (i.e., a torque variation) and a variation in the injection quantity sensing value of the injection quantity sensing section among the cylinders (i.e., an injection quantity variation).

20 Claims, 10 Drawing Sheets

OTHER PUBLICATIONS

U.S. Appl. No. 12/210,409, Koji Ishizuka et al., filed Sep. 15, 2008.
U.S. Appl. No. 12/195,609, Kenichiro Nakata et al., filed Aug. 21, 2008.
U.S. Appl. No. 12/210,440, Kenichiro Nakata et al., filed Sep. 15, 2008.
U.S. Appl. No. 12/235,917, Kenichiro Nakata et al., filed Sep. 23, 2008.
U.S. Appl. No. 12/233,800, Kenichiro Nakata et al., filed Sep. 19, 2008.
U.S. Appl. No. 12/186,038, Kenichiro Nakata et al., filed Aug. 5, 2008.
U.S. Appl. No. 12/194,917, Kenichiro Nakata et al., filed Aug. 20, 2008.
U.S. Appl. No. 12/187,638, Kenichiro Nakata et al., filed Aug. 7, 2008.
U.S. Appl. No. 12/189,376, Kenichiro Nakata et al., filed Aug. 11, 2008.
U.S. Appl. No. 12/236,882, Koji Ishizuka et al., filed Sep. 24, 2008.
U.S. Appl. No. 12/201,426, Kenichiro Nakata et al., filed Aug. 29, 2008.
U.S. Appl. No. 12/255,936, Koji Ishizuka et al., filed Oct. 22, 2008.
U.S. Appl. No. 12/256,100, Koji Ishizuka et al., filed Oct. 22, 2008.
Japanese Office Action dated Aug. 28, 2009, issued in corresponding Japanese Application No. 2007-279639, with English translation.

* cited by examiner

EXHAUST GAS RECIRCULATION DISTRIBUTION VARIATION SENSING DEVICE

CROSS REFERENCE TO RELATED APPLICATION

This application is based on and incorporates herein by reference Japanese Patent Application No. 2007-279639 filed on Oct. 26, 2007.

BACKGROUND OF THE INVENTION

1. Field of the Invention

The present invention relates to an exhaust gas recirculation distribution variation sensing device that is applied to a multi-cylinder internal combustion engine and that senses an exhaust gas recirculation distribution variation as a distribution variation of recirculated exhaust gas to respective cylinders.

2. Description of Related Art

Conventionally, FCCB correction for correcting fuel injection quantities of the respective cylinders is known as correction for smoothing a variation in an injection quantity among cylinders (i.e., an injection quantity variation) caused by individual differences and aging degradation of injectors provided in the respective cylinders and the like in a multi-cylinder internal combustion engine (for example, refer to Patent document 1: JP-A-2001-355500). In the FCCB correction, sensing values of rotation speed of a crankshaft corresponding to combustion strokes of the respective cylinders are extracted from the sensing values of the rotation speed of the crankshaft. A variation among the extracted rotation speeds corresponding to the respective cylinders is regarded as a variation among output torque magnitudes generated by the respective cylinders. The rotation speeds corresponding to the respective cylinders are compared with an average value of the rotation speeds of all the cylinders, and increase/decrease correction (FCCB correction) of the fuel injection quantities of the respective cylinders is performed to smooth the variation in the rotation speed among the cylinders.

In addition to the above-mentioned variation in the injection quantity among the cylinders, the factors of the variation in the output torque among the cylinders include a variation in distribution of recirculated exhaust gas to the respective cylinders, which is performed by EGR (exhaust gas recirculation) as shown by a solid line L1 in FIG. 5. The variation in the distribution of the recirculated exhaust gas to the respective cylinders will be referred to as an EGR distribution variation, hereinafter. However, with the above-described FCCB correction, even when the injection quantity variation is not caused, the increase/decrease correction of the injection quantity will be performed for the variation in the output torque among the cylinders (or a variation in the rotation speed among the cylinders) resulting from the EGR distribution variation. As a result, output torque and an emission state of the internal combustion engine cannot be controlled with high accuracy.

SUMMARY OF THE INVENTION

It is an object of the present invention to provide an exhaust gas recirculation distribution variation sensing device that senses a variation in exhaust gas recirculation distribution in a multi-cylinder internal combustion engine.

According to an aspect of the present invention, an exhaust gas recirculation distribution variation sensing device is applied to a multi-cylinder internal combustion engine having a plurality of cylinders and a plurality of injectors respectively provided to the cylinders, wherein the internal combustion engine is structured to distribute recirculated exhaust gas, which is recirculated from an exhaust system to an intake system, to the respective cylinders. The exhaust gas recirculation distribution variation sensing device has a torque sensing section, an injection quantity sensing section, and an exhaust gas recirculation distribution variation calculating section.

The torque sensing section senses instantaneous torque caused with combustion of fuel injected from the injector or a physical quantity relevant to the instantaneous torque (referred to simply as instantaneous torque, hereafter) for each cylinder.

The injection quantity sensing section senses an actual injection quantity of the injected fuel or a physical quantity relevant to the injection quantity (referred to simply as an injection quantity, hereafter) for each cylinder.

The exhaust gas recirculation distribution variation calculating section calculates an exhaust gas recirculation distribution variation as a distribution variation of the recirculated exhaust gas to the respective cylinders based on a variation (a torque variation) in the torque sensing value of the torque sensing section among the cylinders and a variation (an injection quantity variation) in the injection quantity sensing value of the injection quantity sensing section among the cylinders.

That is, according to the above-described aspect of the present invention, the instantaneous torque caused with the combustion of the fuel injected from the injector and the injection quantity at the time are sensed for each cylinder, and the exhaust gas recirculation distribution variation is calculated based on the torque variation and the injection quantity variation obtained from the sensing results. If the torque variation occurs in a mode different from the mode of the injection quantity variation, it can be determined that the difference in the variation mode is not caused by the injection quantity variation but is caused by the exhaust gas recirculation distribution variation. In this case, the exhaust gas recirculation distribution variation can be calculated.

For example, a deviating degree of the torque sensing value from the injection quantity sensing value is calculated as an exhaust gas recirculation distribution characteristic value for each cylinder. For example, the deviating degree is a ratio of the torque sensing value to a torque value converted from the injection quantity sensing value. A variation in the calculated exhaust gas recirculation distribution characteristic value among the cylinders is calculated as the exhaust gas recirculation distribution variation.

According to the above-described aspect of the present invention capable of sensing the exhaust gas recirculation distribution variation in this way, exhaust gas recirculation distribution variation amounts of the respective cylinders can be calculated and learned, for example. The injection quantity variation can be calculated based on the actual injection quantities of the respective cylinders sensed by the injection quantity sensing section, and the calculation result can be learned. Accordingly, the exhaust gas recirculation distribution variation and the injection quantity variation can be learned separately. For example, by changing control contents of the injection mode (such as the injection quantity, injection timing, and the number of injection stages in the case of multi-stage injection) based on the learning result, the output torque and the emission state of the internal combustion can be controlled with high accuracy.

According to another aspect of the present invention, the exhaust gas recirculation distribution variation sensing device further has an injection controlling section that injects the same quantity of the fuel sequentially into the respective cylinders such that the injection quantity sensing values of all the cylinders coincide with each other. The torque sensing section senses instantaneous torque caused with combustion of the fuel injected by the injection controlling section or a physical quantity relevant to the instantaneous torque for each cylinder. The exhaust gas recirculation distribution variation calculating section calculates the exhaust gas recirculation distribution variation while bringing the variation in the injection quantity sensing value of the injection quantity sensing section among the cylinders to zero.

That is, the exhaust gas recirculation distribution variation is calculated based on the torque variation while bringing the injection quantity variation to zero by equalizing the actual injection quantities of the respective cylinders to each other. Therefore, the exhaust gas recirculation distribution variation can be calculated in a state where the various conditions concerning the injection quantity (such as a ratio of an intake quantity to the injection quantity) are equalized. Accordingly, the element of the variation in the above-described various conditions among the cylinders can be eliminated from the calculation result (i.e., the exhaust gas recirculation distribution variation) obtained by the exhaust gas recirculation distribution variation calculating section. As a result, the exhaust gas recirculation distribution variation can be obtained with high accuracy.

According to another aspect of the present invention, the exhaust gas recirculation distribution variation sensing device further has a small injection controlling section, a cylinder characteristic variation calculating section, and an exhaust gas recirculation distribution variation correcting section.

The small injection controlling section performs small injections sequentially in the respective cylinders for injecting a small quantity of fuel from each injector regardless of manipulation, which is performed by a driver to operate the internal combustion engine, in a state where an exhaust gas recirculation valve is fully closed.

The cylinder characteristic variation calculating section calculates a cylinder characteristic variation as a variation in a cylinder characteristic among the cylinders based on a variation in an actual injection quantity of the small injection among the cylinders and a variation in an increase amount of output torque caused in connection with the small injection among the cylinders.

The exhaust gas recirculation distribution variation correcting section corrects the exhaust gas recirculation distribution variation by subtracting the cylinder characteristic variation from the exhaust gas recirculation distribution variation.

There is a concern that the exhaust gas recirculation distribution variation calculated by the exhaust gas recirculation distribution variation calculating section contains a cylinder characteristic variation due to a difference in characteristics of the respective cylinders (for example, variations in various frictions in the cylinders, a variation among compression ratios of the cylinders and the like). In this regard, according to the above-described aspect of the present invention, the output torque is increased by the small injection, and the cylinder characteristic variation is calculated based on the variation in the torque increase amount among the cylinders (i.e., a torque increase amount variation) and the variation in the injection quantity among the cylinders (i.e., an injection quantity variation) at the time. If the torque increase amount variation occurs in a mode different from a mode of the injection quantity variation, it can be determined that the difference in the variation mode is not caused by the injection quantity variation but is caused by the difference in the characteristics of the respective cylinders. In this case, the cylinder characteristic variation can be calculated.

For example, a deviating degree of the torque increase amount sensing value from the injection quantity sensing value is calculated as a cylinder characteristic value for each cylinder. For example, the deviating degree is a ratio of the torque increase amount sensing value to a torque increase amount converted from the injection quantity sensing value. A variation in the calculated cylinder characteristic value among the cylinders is calculated as the cylinder characteristic variation.

Thus, according to the above-described aspect of the present invention, the cylinder characteristic variation can be calculated, and the exhaust gas recirculation distribution variation correcting section corrects the exhaust gas recirculation distribution variation by subtracting the cylinder characteristic variation from the exhaust gas recirculation distribution variation. Thus, the correction is performed to remove the element of the cylinder characteristic variation from the exhaust gas recirculation distribution variation calculated by the exhaust gas recirculation distribution variation calculating section. Therefore, above-described concern is eliminated.

It is preferable to perform the small injection described above during a period of no-injection operation, in which the fuel injection from all the injectors is cut (for example, during a period in which an accelerator operation is not performed by a driver). With such the construction, the small injection is performed in a state where little or no fluctuation is caused in the output torque. Accordingly, the torque increase amount sensing section can sense the output torque increase amount and the like with high sensing accuracy.

The injection quantity of the above-described small injection should be preferably small (e.g., 2 $mm^3$/st($mm^3$ per stroke)) to such an extent that the driver of the internal combustion engine (e.g., a driver of a vehicle, in which the internal combustion engine is mounted) does not feel the torque increase when the output torque is increased by the small injection. In the case where a diesel engine is adopted as the internal combustion engine and the injector can perform multi-stage injection for performing the injection multiple times per combustion cycle, it is preferable to perform the small injection with a quantity (for example, a quantity corresponding to a pilot injection or a pre-injection) smaller than a quantity of a main injection in the multi-stage injection. Thus, an increasing degree of the engine rotation speed against an intention of the driver of the internal combustion engine can be reduced during the above-described no-injection period.

The above-described aspect of the present invention may be provided with a following construction. That is, the small injection controlling section performs the small injection during a deceleration period of a vehicle, in which the internal combustion engine is mounted, and performs the small injections sequentially in the respective cylinders at a predetermined interval or at predetermined intervals during the same deceleration period. With such the construction, the small injections are performed sequentially during the same deceleration period. Therefore, the small injections are performed in a state where various conditions such as fuel temperature as of the small injection are equalized among all the cylinders. As a result, the cylinder characteristic variation can be obtained with high accuracy.

An influence of twisting torque of an output shaft (for example, a crankshaft) of the internal combustion engine over the output torque of the respective cylinders varies among the cylinders. The variation will be referred to as a twisting torque variation, hereafter. A variation amount of the twisting torque variation increases as the rotation speed of the output shaft (i.e., engine rotation speed) or a load of the output shaft increases.

In this regard, according to another aspect of the present invention, the exhaust gas recirculation distribution variation calculating section calculates the exhaust gas recirculation distribution variation based on the torque sensing value and the injection quantity sensing value sensed during an idle operation of a vehicle, in which the internal combustion engine is mounted. Therefore, a degree of inclusion of the element of the twisting torque variation in the exhaust gas recirculation distribution variation calculated by the exhaust gas recirculation distribution variation calculating section can be reduced. Accordingly, the exhaust gas recirculation distribution variation can be obtained with high accuracy.

According to another aspect of the present invention, the exhaust gas recirculation distribution variation calculating section calculates the exhaust gas recirculation distribution variation based on the torque sensing value and the injection quantity sensing value sensed during normal running of a vehicle, in which the internal combustion engine is mounted. Therefore, the torque sensing value and the injection quantity sensing value to be used for calculating the exhaust gas recirculation distribution variation are not limited to the sensing values sensed during the idle operation. Rather, the exhaust gas recirculation distribution variation can be calculated based on the torque sensing value and the injection quantity sensing value sensed during the normal running, i.e., in the wide range of the rotation speed. Therefore, the exhaust gas recirculation distribution variation can be obtained for the respective operation states of the internal combustion engine.

According to another aspect of the present invention, the exhaust gas recirculation distribution variation sensing device further has a learning section that stores the exhaust gas recirculation distribution variation in a map defining a relationship between the exhaust gas recirculation distribution variation and an operation state of the internal combustion engine. Therefore, the control of the output torque and the emission state of the internal combustion engine based on the exhaust gas recirculation distribution variation corresponding to the operation state of the internal combustion engine can be easily realized.

According to another aspect of the present invention, the exhaust gas recirculation distribution variation sensing device further has an injection mode correcting section that corrects an injection mode of the fuel injected from the injector of each cylinder in accordance with the exhaust gas recirculation distribution variation. Therefore, accurate control of the output torque and the emission state of the internal combustion engine can be easily realized by achieving the combustion state corresponding to the exhaust gas recirculation distribution variation for each cylinder.

According to another aspect of the present invention, the injection mode correcting section corrects the injection mode based on the exhaust gas recirculation distribution variation to advance injection start timing of the cylinder, a calculated exhaust gas recirculation distribution quantity of which is relatively large, and to delay the injection start timing of the cylinder, a calculated exhaust gas recirculation distribution quantity of which is relatively small. Thus, the injection start timing of the cylinder, whose exhaust gas recirculation distribution quantity is large and whose ignitability is bad (i.e., whose ignition timing is late), is advanced. The injection start timing of the cylinder, whose exhaust gas recirculation distribution quantity is small and whose ignitability is good (i.e., whose ignition timing is early), is delayed. Thus, the ignition timings of the respective cylinders can be equalized.

According to another aspect of the present invention, the internal combustion engine is structured to distribute and supply the fuel from a pressure accumulator, which accumulates the fuel, to the injectors. The injection quantity sensing section is a fuel pressure sensor for sensing pressure of the fuel supplied to the injector as the physical quantity and is arranged in a fuel passage, which extends from the pressure accumulator to an injection hole of the injector, at a position closer to the injection hole than the pressure accumulator.

The pressure of the fuel supplied to the injector fluctuates in connection with the fuel injection from the injection hole. Therefore, by sensing the fluctuation mode (e.g., a fuel pressure decrease amount, a fuel pressure decrease time, and the like), the actual injection quantity can be calculated. According to the above-described aspect of the present invention paying attention to this point, the fuel pressure sensor that senses the pressure of the fuel supplied to the injector as the physical quantity relevant to the injection quantity is adopted as the injection quantity sensing section. Therefore, the injection quantity can be calculated as mentioned above.

Moreover, according to the above-described aspect of the present invention, the fuel pressure sensor is arranged in the fuel passage, which extends from the pressure accumulator to the injection hole, at the position closer to the injection hole than the pressure accumulator. Therefore, the pressure fluctuation in the injection hole can be sensed before the pressure fluctuation attenuates in the pressure accumulator. Therefore, the pressure fluctuation caused with the injection can be sensed with high accuracy, so the injection quantity can be calculated with high accuracy.

As other application examples than adopting the fuel pressure sensor as the injection quantity sensing section, a lift sensor that senses a valve member lift amount of the injector as a physical quantity relevant to the injection quantity, a flow meter arranged in a fuel supply passage extending to the injection hole for sensing a fuel flow rate as the injection quantity or the like may be adopted as the injection quantity sensing section.

According to another aspect of the present invention, the fuel pressure sensor is fixed to the injector. Therefore, the fixing position of the fuel pressure sensor is closer to the injection hole than in the case where the fuel pressure sensor is fixed to a pipe connecting the pressure accumulator and the injector. Accordingly, the pressure fluctuation in the injection hole can be sensed more appropriately than in the case where the pressure fluctuation is sensed after the pressure fluctuation in the injection hole attenuates in the pipe.

According to another aspect of the present invention, the fuel pressure sensor is fixed to a fuel inlet of the injector. According to another aspect of the present invention, the fuel pressure sensor is mounted inside the injector to sense fuel pressure in an internal fuel passage extending from a fuel inlet of the injector to the injection hole of the injector.

The fixing structure of the fuel pressure sensor can be simplified in the case where the fuel pressure sensor is fixed to the fuel inlet as mentioned above as compared with the case where the fuel pressure sensor is mounted inside the injector. When the fuel pressure sensor is mounted inside the injector, the fixing position of the fuel pressure sensor is closer to the injection hole of the injector than in the case where the fuel pressure sensor is fixed to the fuel inlet. Therefore, the pressure fluctuation in the injection hole can be sensed more appropriately.

According to another aspect of the present invention, an orifice is provided in a fuel passage, which extends from the pressure accumulator to a fuel inlet of the injector for attenuating a pressure pulsation of the fuel in the pressure accumulator. The fuel pressure sensor is arranged downstream of the orifice with respect to a fuel flow direction. If the fuel pressure sensor is arranged upstream of the orifice, the pressure fluctuation after the pressure fluctuation in the injection hole is attenuated by the orifice is sensed. In contrast the fuel pressure sensor is arranged downstream of the orifice according to the above-described aspect of the present invention. Therefore, the pressure fluctuation can be sensed before the pressure fluctuation is attenuated by the orifice, so the pressure fluctuation in the injection hole can be sensed more appropriately.

According to yet another aspect of the present invention, the torque sensing section is a rotation speed sensor for sensing rotation speed of an output shaft of the internal combustion engine (i.e., engine rotation speed) as the physical quantity. If the torque increases, the rotation speed of the output shaft also increases in accordance with the increase amount of the torque. Therefore, according to the above-described aspect of the present invention that adopts the rotation speed sensor as the torque sensing section, the output torque can be suitably calculated. As other application examples than adopting the rotation speed sensor as the torque sensing section, a cylinder pressure sensor for sensing pressure in a combustion chamber of the internal combustion engine as a physical quantity relevant to the torque increase amount or the like may be adopted as the torque sensing section.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereafter, embodiments of the present invention will be described with reference to the drawings.

First, an outline of an engine (an internal combustion engine) having an internal combustion engine control device according to a first embodiment of the present invention will be explained briefly.

The device according to the present embodiment is used for a diesel engine (an internal combustion engine) for a four-wheeled vehicle. The engine performs injection supply (direct injection supply) of high-pressure fuel (for example, light oil at injection pressure of 1000 atmospheres or higher) directly into a combustion chamber. It is assumed that the engine according to the present embodiment is a four-stroke reciprocating diesel engine (an internal combustion engine) having multiple cylinders (for example, in-line four cylinders). In each of the four cylinders #1 to #4, a combustion cycle consisting of four strokes of an intake stroke, a compression stroke, a combustion stroke, and an exhaustion stroke is sequentially performed in the order of the cylinders #1, #3, #4, and #2 in the cycle of 720° CA (degree crank angle), and in more detail, while the combustion cycles are deviated from each other by 180° CA between the cylinders.

Next, a fuel system of the engine will be explained with reference to FIGS. 1 to 4.

Figure 1:
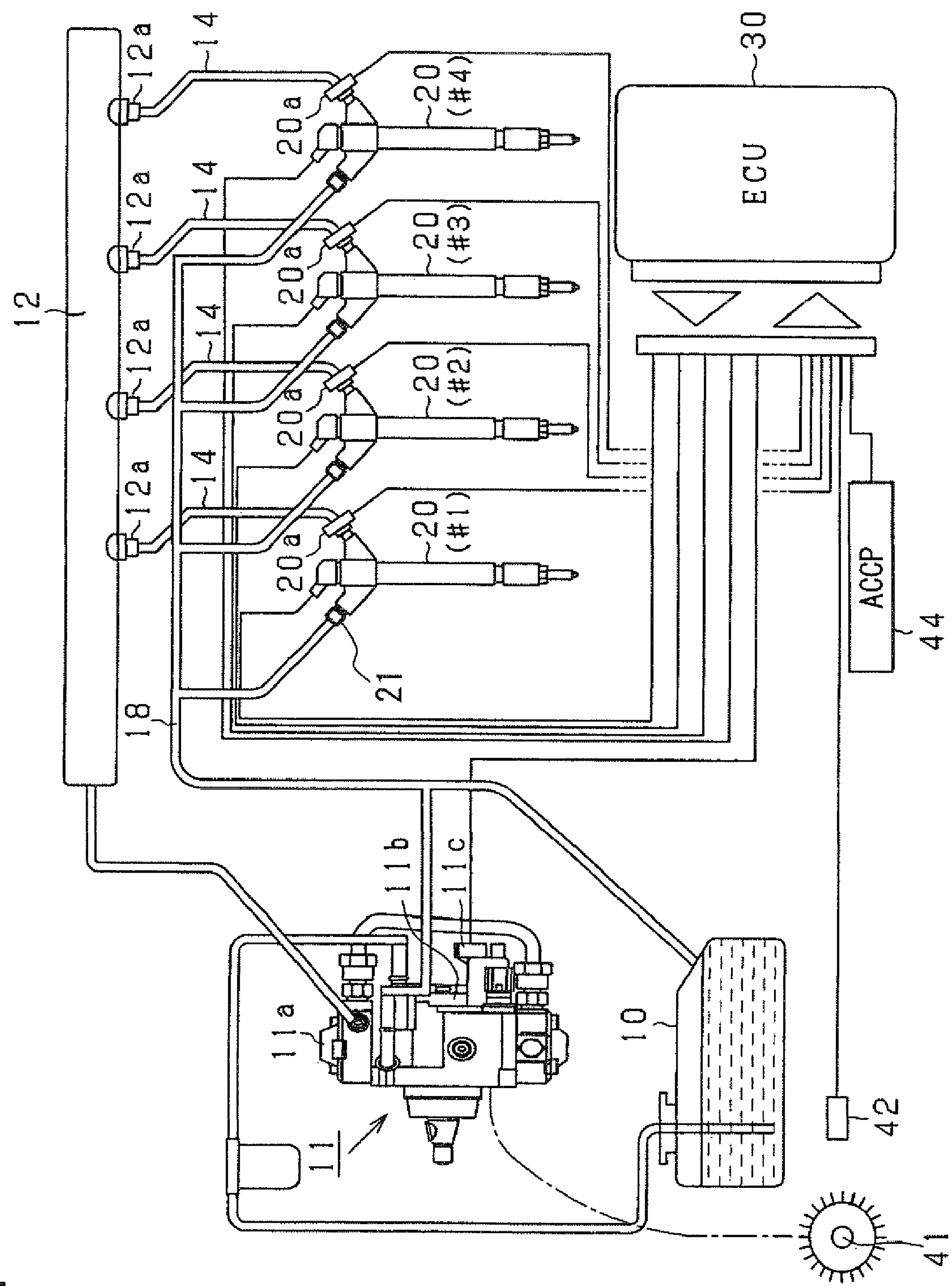
FIG. 1 is a configuration diagram showing a fuel system including an EGR distribution variation sensing device according to a first embodiment of the present invention.

FIG. 1 is a configuration diagram showing a common rail fuel injection system according to the present embodiment. An ECU 30 (an electronic control unit) provided in the system adjusts a supply quantity of current supplied to a suction control valve 11*c*, thereby controlling a fuel discharge quantity of a fuel pump 11 to a desired value. Thus, the ECU 30 performs feedback control (for example, PID control) for conforming fuel pressure in a common rail 12 (a pressure accumulator), i.e., current fuel pressure measured with a fuel pressure sensor 20*a*, to a target value (target fuel pressure). The ECU 30 controls a fuel injection quantity of a predetermined cylinder of the target engine and eventually an output of the engine (i.e., rotation speed or torque of an output shaft) to desired magnitudes based on the fuel pressure.

The devices constituting the fuel supply system including the fuel tank 10 the fuel pump 11, the common rail 12, and the injectors 20 (fuel injection valves) are arranged in this order from a fuel flow upstream side. The fuel pump 11 consists of a high-pressure pump 11*a* and a low-pressure pump 11*b* driven by an output of the target engine. The fuel pump 11 is structured such that fuel drawn by the low-pressure pump 11*b* from the fuel tank 10 is pressurized and discharged by the high-pressure pump 11*a*. A fuel pumping quantity sent to the high-pressure pump 11*a* and an eventual fuel discharge quantity of the fuel pump 11 are metered by the suction control valve 11*c* (SCV) provided on a fuel suction side of the fuel pump 11. The fuel pump 11 controls the fuel discharge quantity of the pump 11 to a desired value by regulating the drive current (eventually, an opening degree) of the suction control valve 11*c*.

The low-pressure pump 11*b* is constituted as a trochoid feed pump, for example. The high-pressure pump 11*a* consists of a plunger pump, for example. The high-pressure pump 11*a* is structured to be able to sequentially pump the fuel, which is sent to pressurization chambers, at predetermined timing by reciprocating predetermined plungers (for example, three plungers) in axial directions thereof with an eccentric cam (not illustrated) respectively.

The fuel in the fuel tank 10 is pressure-fed (pumped) to the common rail 12 by the fuel pump 11 and is accumulated in the common rail 12 at a high-pressure state. Then, the fuel is distributed and supplied to the injectors 20 of the cylinders #1 to #4 respectively through high-pressure pipes 14 provided to the respective cylinders. Fuel discharge holes 21 of the injectors 20(#1) to 20(#4) are connected with a pipe 18 for returning excess fuel to the fuel tank 10. An orifice 12*a* (a fuel pulsation reducing section) is provided between the common rail 12 and the high-pressure pipe 14 for attenuating a pressure pulsation of the fuel flowing from the common rail 12 to the high-pressure pipe 14.

Figure 2:
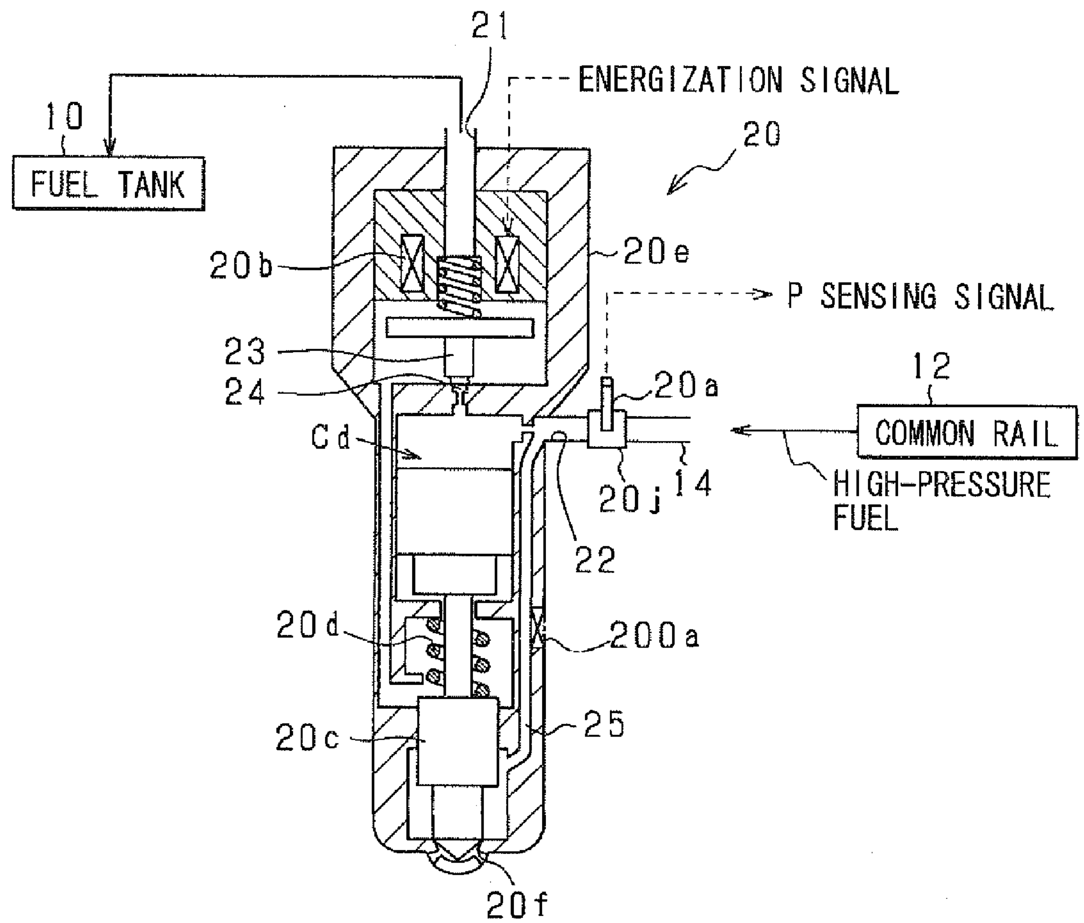
FIG. 2 is an internal side view schematically showing an internal structure of an injector according to the first embodiment.

A detailed structure of the injector 20 is shown in FIG. 2. Basically, the four injectors 20(#1) to 20(#4) have the same structure (for example, a structure shown in FIG. 2). Each injector 20 is a hydraulic drive type injector using the engine combustion fuel (i.e., the fuel in the fuel tank 10). In the injector 20, a driving power for the fuel injection is transmitted through an nil pressure chamber Cd (i.e., a control chamber). As shown in FIG. 2, the injector 20 is structured as a fuel injection valve of a normally-closed type that is brought to a valve-closed state when de-energized.

The high-pressure fuel sent from the common rail 12 flows into a fuel inlet 22 formed in a housing 20*e* of the injector 20. Part of the inflowing high-pressure fuel flows into the oil pressure chamber Cd and the other part of the inflowing high-pressure fuel flows toward injection holes 20*f*. A leak hole 24 is formed in the oil pressure chamber Cd and is opened and closed by a control valve 23. If the leak hole 24 is opened by the control valve 23, the fuel in the oil pressure chamber Cd is returned to the fuel tank 10 through the fuel discharge hole 21 from the leak hole 24.

When the fuel injection is performed with the injector 20, the control valve 23 is operated in accordance with an energization state (energization de-energization) of a solenoid 20*b* constituting a two-way electromagnetic valve. Thus, a sealed degree of the oil pressure chamber Cd and eventually pressure in the oil pressure chamber Cd (equivalent to back pressure of a needle valve 20*c*) are increased/decreased. Due to the increase/decrease in the pressure, the needle valve 20*c* reciprocates (moves upward and downward) inside the housing 20*e* along with or against an extensional force of a spring 20*d* (a coil spring) (i.e., an elastic force of the spring 20*d* to extend). Accordingly, a fuel supply passage 25 extending to the injection holes 20*f* (a necessary number of which are bored) is opened/closed at a halfway thereof (more specifically, at a tapered seat face, which the needle valve 20*c* is seated on and which the needle valve 20*c* is separated from in accordance with the reciprocating movement of the needle valve 20*c*).

Drive control of the needle valve 20*c* is performed through on-off control. That is, a pulse signal (an energization signal) directing ON/OFF is sent from the ECU 30 to a drive section (the two-way electromagnetic valve) of the needle valve 20*c*. The needle valve 20*c* lifts and opens the injection holes 20*f* when the pulse is ON (or OFF), and the needle valve 20*c* descends to block the injection holes 20*f* when the pulse is OFF (or ON).

The pressure increase processing of the oil pressure chamber Cd is performed by the fuel supply from the common rail 12. Pressure reduction processing of the oil pressure chamber Cd is performed by operating the control valve 23 through the energization to the solenoid 20*b* and thus opening the leak hole 24. Thus, the fuel in the oil pressure chamber Cd is returned to the fuel tank 10 through the pipe 18 (shown in FIG. 1) connecting the injector 20 and the fuel tank 10. That is, the operation of the needle valve 20*c* that opens and closes the injection holes 20*f* is controlled by adjusting the fuel pressure in the oil pressure chamber Cd through the opening and closing operation of the control valve 23.

Thus, the injector 20 has the needle valve 20*c* that performs valve opening and valve closing of the injector 20 by opening and closing the fuel supply passage 25 extending to the injection holes 20*f* through the predetermined reciprocation operation inside the valve body (i.e., the housing 20*e*). In a non-driven state, the needle valve 20*c* is displaced in a valve-closing direction by the force (the extensional force of the spring 20*d*) constantly applied to the needle valve 20*c* in the valve-closing direction. In a driven state, the needle valve 20*c* is applied with a driving force, so the needle valve 20*c* is displaced in a valve-opening direction against the extensional force of the spring 20*d*. The lift amount of the needle valve 20*c* changes substantially symmetrically between the non-driven state and the driven state.

A fuel pressure sensor 20*a* (also refer to FIG. 1) for sensing the fuel pressure is fixed to the injector 20. The fuel inlet 22 formed in the housing 20*e* and the high-pressure pipe 14 are connected through a jig 20*j*, and the fuel pressure sensor 20*a* is fixed to the jig 20*j*. Thus, by fixing the fuel pressure sensor 20*a* to the fuel inlet 22 of the injector 20 in this way, fuel pressure (inlet pressure) at the fuel inlet 22 can be sensed at any time. More specifically, a fluctuation waveform of the fuel pressure accompanying an injection operation of the injector 20, a fuel pressure level (i.e., stable pressure), fuel injection pressure and the like can be sensed (measured) with the output of the fuel pressure sensor 20*a*.

The fuel pressure sensors 20*a* are provided to the multiple injectors 20(#1) to 20(#4) respectively. The fluctuation waveform of the fuel pressure accompanying the injection operation of the injector 20 concerning a predetermined injection can be sensed with high accuracy based on the outputs of the fuel pressure sensors 20*a* (as mentioned in more detail later).

A microcomputer mounted in the ECU 30 consists of a CPU (a basic processing unit) for performing various kinds of computation, a RAM as a main memory for temporarily storing data in the process of the computation, computation results and the like, a ROM as a program memory, an EEPROM as a memory for data storage, a backup RAM (a memory invariably supplied with power from a backup power supply such as an in-vehicle battery even after a main power supply of the ECU 30 is stopped), and the like. Various kinds of programs, control maps and the like concerning the engine control including the program concerning the fuel injection control are beforehand stored in the ROM. Various kinds of control data including design data of the target engine and the like are beforehand stored in the memory for data storage (for example, the EEPROM).

The ECU 30 calculates a rotation angle position and rotation speed (engine rotation speed NE) of an output shaft (a crankshaft 41) of the target engine based on a sensing signal inputted from a crank angle sensor 42. The ECU 30 calculates an operation amount ACCP (a pressed amount) of an accelerator by a driver based on a sensing signal inputted from an accelerator sensor 44. The ECU 30 grasps an operation state of the target engine and requests of the user based on the sensing signals of the above-described various sensors 42, 44 and various sensors mentioned later. The ECU 30 performs various kinds of control relating to the above-described engine in the optimum modes corresponding to the situation of each time by operating the various actuators such as the above-described suction control valve 11*c* and the injectors 20 in accordance with the operation state of the target engine and the requests of the user.

Next, an outline of control of the fuel system performed by the ECU 30 will be explained.

The microcomputer of the ECU 30 calculates the fuel injection quantity in accordance with the engine operation state (such as the engine rotation speed NE), the operation amount ACCP of the accelerator by the driver and the like at each time and outputs an injection control signal (an injection command signal) for directing the fuel injection with the calculated fuel injection quantity to the injector 20 in synchronization with desired injection start timing. When the injector 20 operates with a drive amount (for example, a valve opening period) corresponding to the injection control signal, the output torque of the target engine is controlled to a target value.

Figure 3:
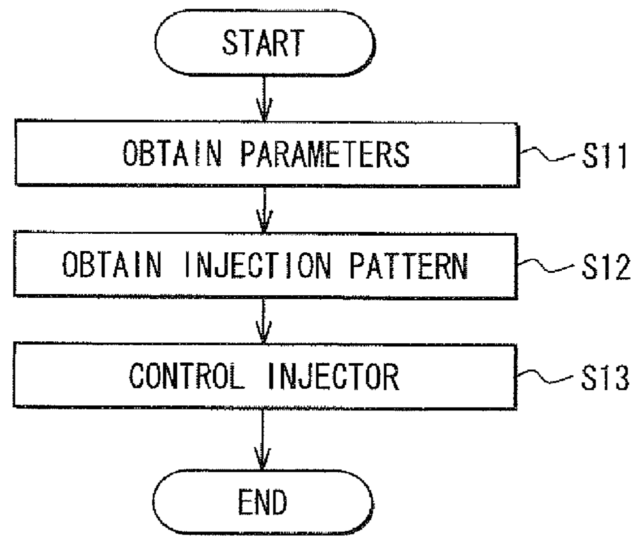
FIG. 3 is a flowchart showing a basic procedure of fuel injection control processing according to the first embodiment.

Hereafter, a fundamental processing procedure of the fuel system control according to the present embodiment will be explained with reference to FIG. 3. Values of various parameters used in the processing shown in FIG. 3 are stored at any time in the storage device mounted in the ECU 30 such as the RAM, the EEPROM or the backup RAM and are updated at any time when necessary. The processing of FIG. 3 is performed based on the program stored in the ROM of the ECU 30.

As shown in FIG. 31 first in S11 (S means "Step") in a series of the processing, predetermined parameters such as the current engine rotation speed NE (i.e., an actual measurement value measured by the crank angle sensor 42) and the fuel pressure (i.e., an actual measurement value measured by the fuel pressure sensor 20*a*) are read and also the accelerator operation amount ACCP (i.e., an actual measurement value measured by the accelerator sensor 44) by the driver at the time and the like are read.

In following S12, an injection pattern is set based on the various parameters read in S11. For example, in the case of a single-stage injection, an injection quantity Q (an injection period) of the injection is variably set in accordance with the torque that should be generated in the output shaft (the crankshaft 41), i.e., request torque that is calculated from the accelerator operation amount ACCP and the like and that is equivalent to the engine load at the time. In the case of an injection pattern of a multi-stage injection, a total injection quantity Q (a total injection period) of injections contributing to torque is variably set in accordance with the torque that should be generated in the crankshaft 41, i.e., the request torque.

Figure 4:
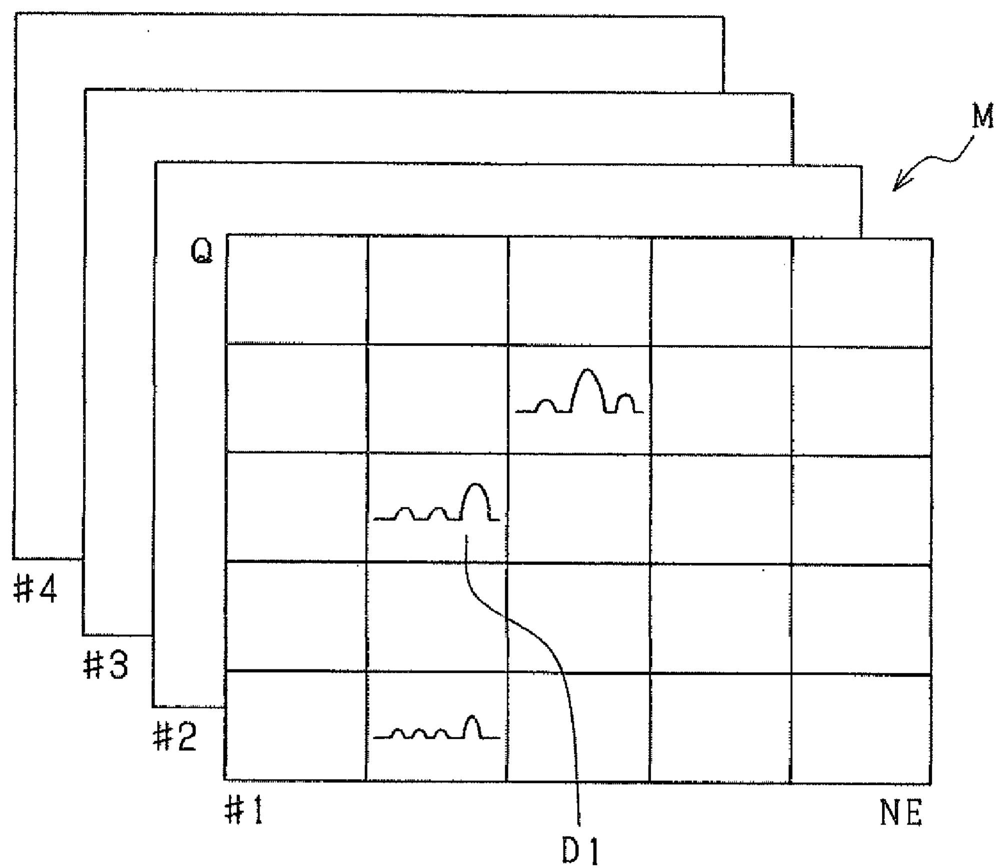
FIG. 4 is a diagram showing an injection control map according to the first embodiment.

The injection pattern is obtained based on a map M (an injection control map or a mathematical expression) shown in FIG. 4 stored in the EEPROM, for example. The injection pattern is a pattern optimized to achieve the request torque and a suitable emission state. More specifically, the optimum injection patterns (adaptation values) are beforehand obtained by experiment and the like in anticipated ranges of the predetermined parameters (read in S11) and are written in the injection control map M, for example.

For example, the injection pattern is defined by parameters such as the number of injection stages (i.e., the time number of injections performed in one combustion cycle), the injection start timing of each injection and the injection period of each injection (equivalent to the injection quantity). The map M according to the present embodiment defines the relationship among the total injection quantity Q, the engine rotation speed NE, and the injection pattern. The map M is provided for each one of the injectors 20 of the respective cylinders #1 to #4. The map M may be provided for each of other parameters such as engine coolant temperature.

The command value (the command signal) for the injector 20 is set based on the injection pattern obtained using the injection control map M. Thus, a pilot injection, a pre-injection, an after injection, a post-injection and the like are suitably performed with a main injection in accordance with the situation of the vehicle and the like.

The injection pattern obtained based on the injection control map M is corrected with a correction coefficient (stored in the EEPROM in the ECU 30, for example) that is separately updated. For example, a set value is calculated by dividing the map value by the correction coefficient. Thus, the injection pattern of the injection that should be performed at the time and eventually the command signal for the injector 20 corresponding to the injection pattern are obtained. The correction coefficient (more strictly a predetermined coefficient out of the multiple types of coefficients) is sequentially updated by separate processing during the operation of the internal combustion engine.

The thus-set injection pattern or the eventual command value (the command signal) corresponding to the injection pattern are used in following S13. That is, in S13, the drive of the injector 20 is controlled based on the command value (the command signal), or more specifically, by outputting the command signal to the injector 20. After the drive control of the injector 20, the series of the processing shown in FIG. 3 is ended.

Next, an intake-exhaust system of the engine will be explained with reference to FIG. 5.

Figure 5:
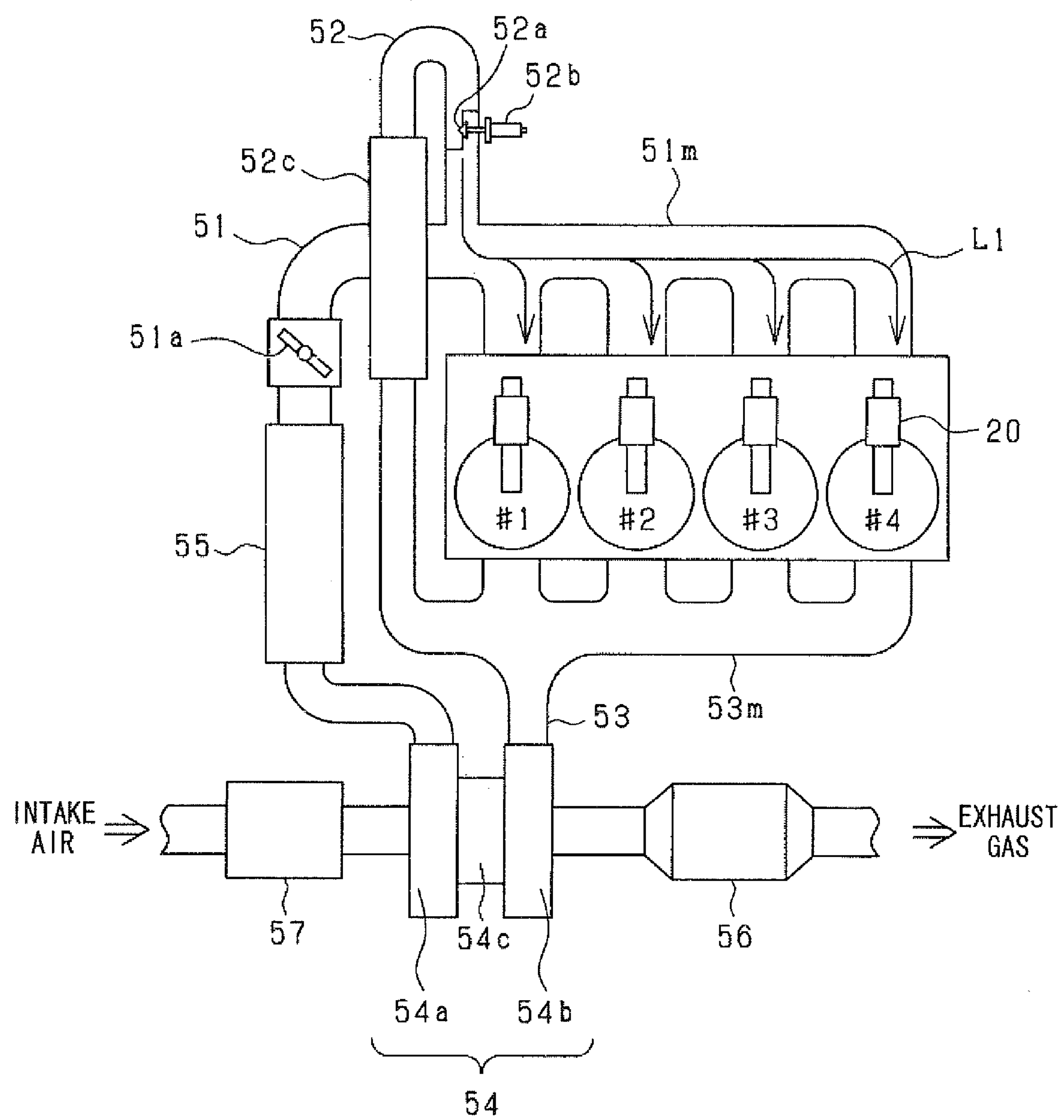
FIG. 5 is a schematic diagram showing an intake-exhaust system according to the first embodiment.

FIG. 5 is a configuration diagram showing the intake-exhaust system of the engine shown in FIG. 1. The engine has an EGR pipe 52 for recirculating exhaust gas from an exhaust system to an intake system. The engine returns a part of the exhaust gas to the intake pipe 51, thereby lowering the combustion temperature and reducing the NOx, for example. An EGR valve 52*a* for regulating an EGR quantity (i.e., an exhaust gas recirculation quantity) is provided in the EGR pipe 52. An electric actuator 52*b* causes the EGR valve 52*a* to perform opening and closing action. The EGR quantity is maximized at the time of fully-opening action of the EGR valve 52*a* and is brought to zero at the time of fully-closing action of the EGR valve 52*a*.

Fresh air from the intake pipe 51 and the recirculated exhaust gas from the EGR pipe 52 are distributed to the respective cylinders #1 to #4 by an intake manifold 51*m*. The exhaust gas from the respective cylinders #1 to #4 is collected by an exhaust manifold 53*m*. Then, a part of the exhaust gas flows into the EGR pipe 52 and is recirculated, and the other part is discharged through an exhaust pipe 53. An EGR cooler 52*c* is provided in the EGR pipe 52 for cooling the recirculated exhaust gas, thereby reducing the volume (i.e., increasing density) of the recirculated exhaust gas. Thus, the EGR cooler 52*c* improves a charging efficiency of the intake air flowing into the combustion chamber.

A throttle valve 51*a* that adjusts a flow rate of the fresh air in the intake air flowing into the combustion chamber is provided in the intake pipe 51 upstream of a point where the EGR pipe 52 is connected to the intake pipe 51. An electric actuator (not shown) causes the throttle valve 51*a* to perform opening-closing action. The fresh air quantity is maximized at the time of fully-opening action of the throttle valve 51_a_ and is brought to zero at the time of fully-closing action of the throttle valve 51_a_.

A turbocharger 54 (a supercharger) is provided between the intake pipe 51 and the exhaust pipe 53. The turbocharger 54 has a compressor impeller 54_a_ provided in the intake pipe 51 and a turbine wheel 54_b_ provided in the exhaust pipe 53. The compressor impeller 54_a_ and the turbine wheel 54_b_ are connected through a shaft 54_c_. In the turbocharger 54, the turbine wheel 54_b_ is rotated by the exhaust gas flowing through the exhaust pipe 53, and the rotating force is transmitted to the compressor impeller 54_a_ through the shaft 54_c_. The intake air flowing through the inside of the intake pipe 51 is compressed by the compressor impeller 54_a_, and supercharge is performed. The air supercharged by the turbocharger 54 is cooled by an intercooler 55 and then fed to the downstream side of the intercooler 55. The intercooler 55 cools the intake air to reduce the volume (i.e., to increase the density) of the intake air, thereby improving the charging efficiency of the intake air flowing into the combustion chamber.

A purification device 56 for purifying the exhaust gas is fixed to the exhaust pipe 53 downstream of the turbine wheel 54_b_. For example, the purification device 56 may be a DPF (diesel particulate filter) for collecting particulate matters in the exhaust gas, a NOx catalyst for purifying the NOx in the exhaust gas, an oxidation catalyst for purifying HC and CO in the exhaust gas, and the like. An air cleaner 57 is provided in the intake pipe 51 upstream of the compressor impeller 54_a_ for removing extraneous matters contained in the intake air.

A variation can be caused in the output torque generated by the respective cylinders #1 to #4. As mentioned above, the factors of the variation in the output torque among the cylinders (a torque variation) include the EGR distribution variation in addition to the injection quantity variation. Therefore, in the present embodiment, learning is performed by calculating the EGR distribution variation in a state of a real car where the engine is mounted in a vehicle and by changing and storing the data (the injection pattern) of the injection control map M based on the calculated EGR distribution variation.

Hereafter, processing procedures for calculating the EGR distribution variation and for learning the map M will be explained with reference to FIGS. 6 to 11. For example, the microcomputer of the ECU 30 repeatedly performs the processing of FIGS. 6 and 10 in a predetermined cycle (for example, a computation cycle of the microcomputer) or at every predetermined crank angle.

Figure 6:
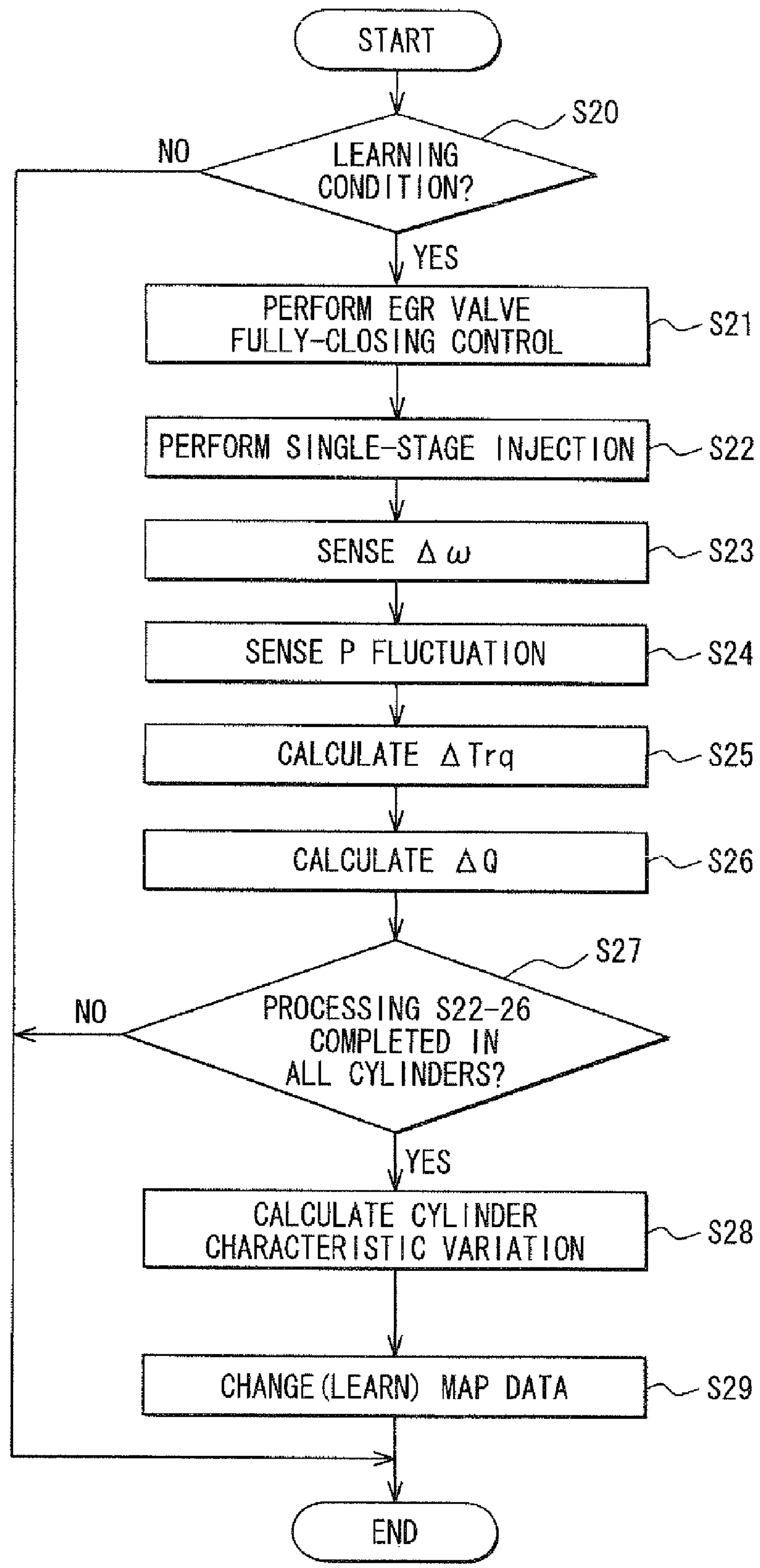
FIG. 6 is a flowchart showing a processing procedure for learning the injection control map according to the first embodiment.
Figure 10:
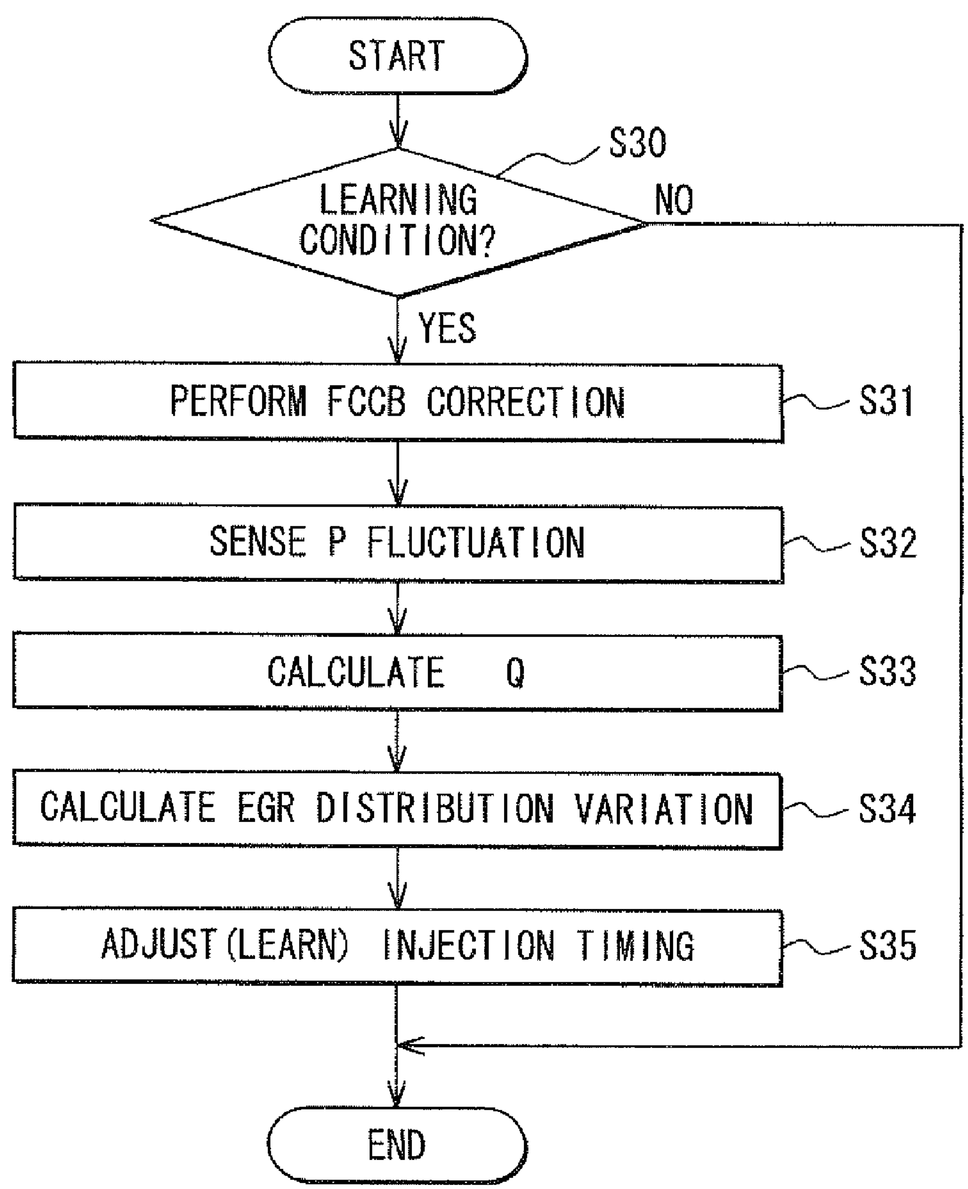
FIG. 10 is a flowchart showing a processing procedure for learning the injection control map according to the first embodiment.

First, outline of the processing of FIGS. 6 and 10 will be explained. The processing of FIG. 6 is processing for performing the small injections in the respective cylinders while the EGR valve 52_a_ is fully closed, thereby calculating a cylinder characteristic variation, from which the element of the EGR distribution variation is removed. For example, the cylinder characteristic variation includes variations in various frictions in the cylinders, a variation in compression ratios in the cylinders, and the like. The processing of FIG. 10 is processing for calculating the EGR distribution variation including the element of the cylinder characteristic variation based on the injection quantity sensing value and the torque sensing value sensed during the idle operation period. Correction of subtracting the cylinder characteristic variation calculated by the processing of FIG. 6 from the EGR distribution variation calculated by the processing of FIG. 10 is performed to eliminate the element of the cylinder characteristic variation from the EGR distribution variation, thereby obtaining the EGR distribution variation with high accuracy.

Next, details of the processing of FIG. 6 will be explained. In a series of the processing, first in S20, it is determined whether a learning condition is satisfied. For example, the learning condition includes occurrence of a no-injection deceleration period, in which the accelerator is released, the vehicle is brought to a deceleration state, and fuel cut control is performed. Alternatively, the learning condition may be satisfied if the no-injection state occurs even when the deceleration state does not occur. When it is determined that the learning condition is satisfied (S20: YES), processing of subsequent S21 to S26 is performed for each of the cylinders #1 to #4.

In following S21, the EGR valve 52_a_ is fully closed to bring the EGR quantity to zero. In following S22 (a small injection controlling section), a single-stage injection (a single-shot injection) for opening and closing the injection holes 20_f_ only once is performed by controlling the drive of the injector 20. That is, a single shot of a small injection for learning is performed regardless of the accelerator operation by the vehicle driver. A predetermined small quantity of the fuel is injected through the small injection for the learning. More specifically a command injection period of the injector 20 is calculated from the fuel pressure sensed with the fuel pressure sensor 20_a_ and the small quantity (i.e., the small injection quantity for the learning), and opening operation of the injector 20 is performed in accordance with the command injection period.

The above-described small injection means an injection of a quantity smaller than a main injection such as a pilot injection, a pre-injection and an after injection performed before or after the main injection. The main injection mainly produces output torque required through the operation of the accelerator In the present embodiment, the small injection quantity is set to 2 $mm^3$/st. Alternatively, multiple kinds of the small injection quantity may be set and the processing of following S23 to S26 may be performed for each of the multiple kinds of the small injection quantity.

In following S23, a rotation speed increase amount of the crankshaft 41 caused with combustion due to the small injection is sensed using the crank angle sensor 42 (a torque sensing section). For example, when the small injection by the injector 20(#1) of the first cylinder #1 is performed, the rotation speed at the small injection timing in the case where the small injection is hypothetically not performed is expressed as $\omega(i-1)+a\times t$, wherein $\omega(i-1)$ is the rotation speed at another timing $(i-1)$ preceding the small injection timing by 720° CA, a is decreasing speed of the rotation speed at the another timing $(i-1)$, and t is a time necessary for the rotation of 720° CA to the small injection.

Figure 7:
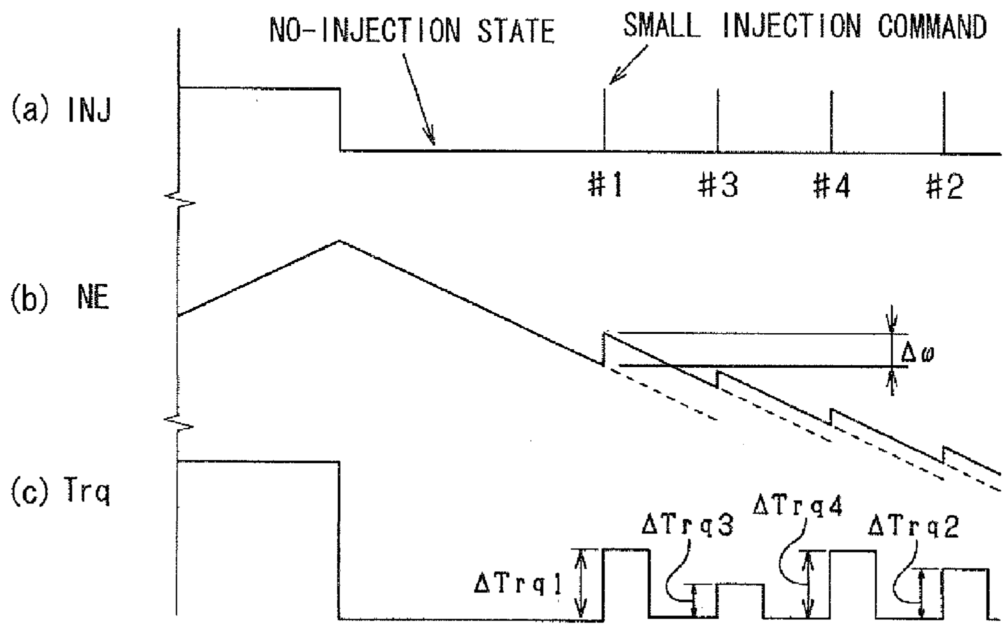
FIG. 7 is a timing chart showing changes of rotation speed and output torque at the time when small injection is performed in the processing of FIG. 6 according to the first embodiment.

Therefore, the rotation increase amount $\Delta\omega$ (refer to part (b) of FIG. 7) accompanying the small injection is calculated by a formula: $\Delta\omega=\omega(i)-\omega(i-1)-a\times t$, using the rotation speed $\omega(i)$ at the time when the small injection is performed. Part (a) of FIG. 7 shows a pulse signal of the injection command INJ and shows a situation, in which small injection commands are outputted during the no-injection state. Part (b) of FIG. 7 shows change of the rotation speed NE caused in connection with the small injections, and part (c) of FIG. 7 is a timing chart showing change of the output torque Trq caused in connection with the small injections. In the present embodiment, as shown in FIG. 7, the small injections are performed in succession in the respective cylinders in the order of the cylinders #1, #3, #4, and #2 (i.e., the order in which the combustion strokes are performed) at predetermined intervals (or at a predetermined interval) during the same deceleration period.

Figure 8:
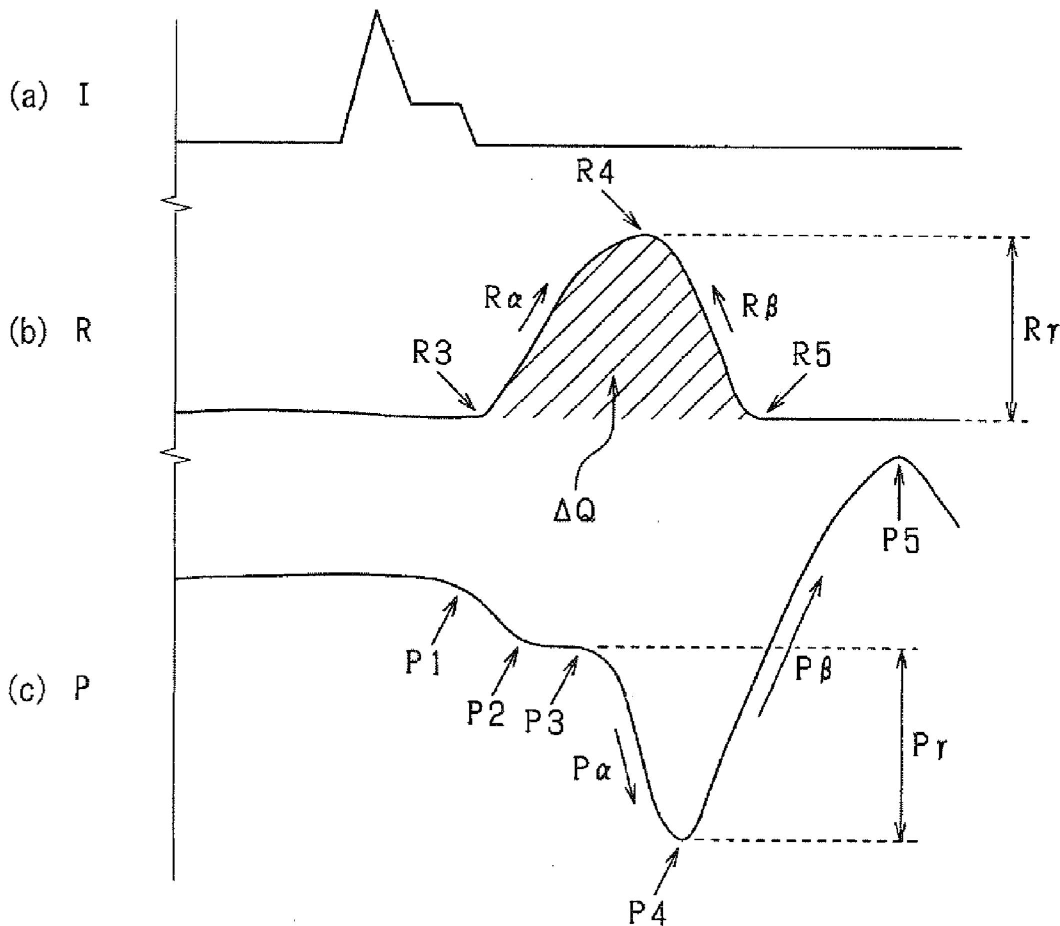
FIG. 8 is a timing chart showing changes of a sensing value of a pressure sensor and an injection rate at the time when the small injection is performed in the processing of FIG. 6 according to the first embodiment.

In following S24, fluctuation of the inlet pressure P caused in connection with the small injection (refer to part (c) of FIG. 8) is sensed with the fuel pressure sensor 20*a* (an injection quantity sensing section). Part (a) of FIG. 8 shows change of driving current I supplied to the solenoid 20*b* based on the small injection command. Part (b) of FIG. 8 shows change of a fuel injection rate R of the fuel from the injection holes 20*f* caused in connection with the small injection. Part (c) of FIG. 8 shows change of the sensed value (the inlet pressure P) of the fuel pressure sensor 20*a* caused with the change of the injection rate R.

The sensing of the fuel pressure fluctuation in S24 is performed by subroutine processing separate from the processing of FIG. 6. It is desirable to serially obtain the sensor output of the fuel pressure sensor 20*a* by the subroutine processing at an interval short enough to be able to plot the profile of the pressure transition waveform with the sensor output. An example profile is illustrated in part (c) of FIG. 8. More specifically, the sensor output should be preferably obtained serially at an interval shorter than 50 microseconds (or more preferably, 20 microseconds).

In following S25, each of increase amounts ΔTrq1 to ΔTrq4 (refer to part (c) of FIG. 7) of the output torque actually caused in connection with the small injections is calculated for each cylinder based on the rotation increase amount Δω sensed in S23. For example, the increase amount ΔTrq1 of the output torque is calculated by a formula: ΔTrq1=bΔω (b is a positive coefficient) or by a map. The increase amounts ΔTrq 1 to ΔTrq4 of the output torque may be calculated by performing correction based on parameters (for example, the engine coolant temperature) other than the rotation increase amount Δω.

In following S26, injection quantities ΔQ1 to ΔQ4 of the fuel injected through the small injections are calculated for the respective cylinders based on the fluctuation of the inlet pressure P sensed in S24. For example, the change of the injection rate R shown in part (b) of FIG. 8 is estimated from the fluctuation of the inlet pressure P shown in part (c) of FIG. 8. Then, an area of a shaded portion shown in part (b) of FIG. 8 out of the estimated injection rate change is calculated as the injection quantity ΔQ (e.g., ΔQ1). The change of the injection rate R can be estimated as mentioned above since there is a correlation between the fluctuation of the pressure (the inlet pressure P) sensed by the fuel pressure sensor 20*a* and the change of the injection rate R as explained below.

That is, the pressure P sensed by the fuel pressure sensor 20*a* falls at a changing point P1 after the drive current I flows through the solenoid 20*b* as shown in part (a) of FIG. 8 and before the injection rate R starts increasing at timing R3. This is because the control valve 23 opens the leak hole 24 and the pressure reduction processing of the oil pressure chamber Cd is performed at the timing P1. Then, the pressure decrease from the changing point P1 stops once at a changing point P2 when the oil pressure chamber Cd is sufficiently depressurized.

Then, as the injection rate R starts increasing at the timing R3, the sensed pressure P starts decreasing at a changing point P3. Then, as the injection rate R reaches the maximum injection rate at timing R4, the decrease of the sensed pressure P stops at a changing point P4. A decrease amount from the changing point P3 to the changing point P4 is larger than a decrease amount from the changing point P1 to the changing point P2.

Then, as the injection rate R starts decreasing at the timing R4, the sensed pressure P starts increasing at the changing point P4. Then, as the injection rate R becomes zero and the actual injection ends at timing R5, the increase of the sensed pressure P stops at a changing point P5. The sensed pressure P after the changing point P5 attenuates while repeating decrease and increase in a fixed cycle (not shown).

Thus, the increase start timing R3 (the injection start timing) and the decrease end timing R5 (the injection end timing) of the injection rate R can be estimated by detecting the changing points P3 and P5 in the fluctuation of the sensed pressure P sensed by the fuel pressure sensor 20*a*. Moreover, the change of the injection rate R can be estimated from the fluctuation of the sensed pressure P based on the correlation between the fluctuation of the sensed pressure P and the change of the injection rate R explained below.

That is, there is a correlation between a pressure decrease rate Pα from the changing point P3 to the changing point P4 of the sensed pressure P and an injection rate increase rate Rα from the changing point R3 to the changing point R4 of the injection rate R. There is a correlation between a pressure increase rate Pβ from the changing point P4 to the changing point P5 and an injection rate decrease rate Rβ from the changing point R4 to the changing point R5. There is a correlation between a pressure decrease amount Pγ from the changing point P3 to the changing point P4 and an injection rate increase amount Rγ from the changing point R3 to the changing point R4. Accordingly, the injection rate increase rate Rα, the injection rate decrease rate Rβ, and the injection rate increase amount Rγ of the injection rate R can be estimated by sensing the pressure decrease rate Pα, the pressure increase rate Pβ, and the pressure decrease amount Pγ from the fluctuation of the sensed pressure P sensed by the fuel pressure sensor 20*a*. As described above, the various states R3, R5, Rα, Rβ, and Rγ of the injection rate R can be estimated, and eventually, the actual injection quantity ΔQ1 as the area of the shaded portion shown in part (b) of FIG. 8 can be calculated.

In following S27, it is determined whether processing of S22 to S26 has been performed for all the cylinders #1 to #4. When it is determined that the processing of S22 to S26 has been completed for all the cylinders (S27: YES), the process proceeds to following S28. When it is determined that the same processing has not been completed yet (S27: NO), the processing of FIG. 6 is ended once.

Figure 9:
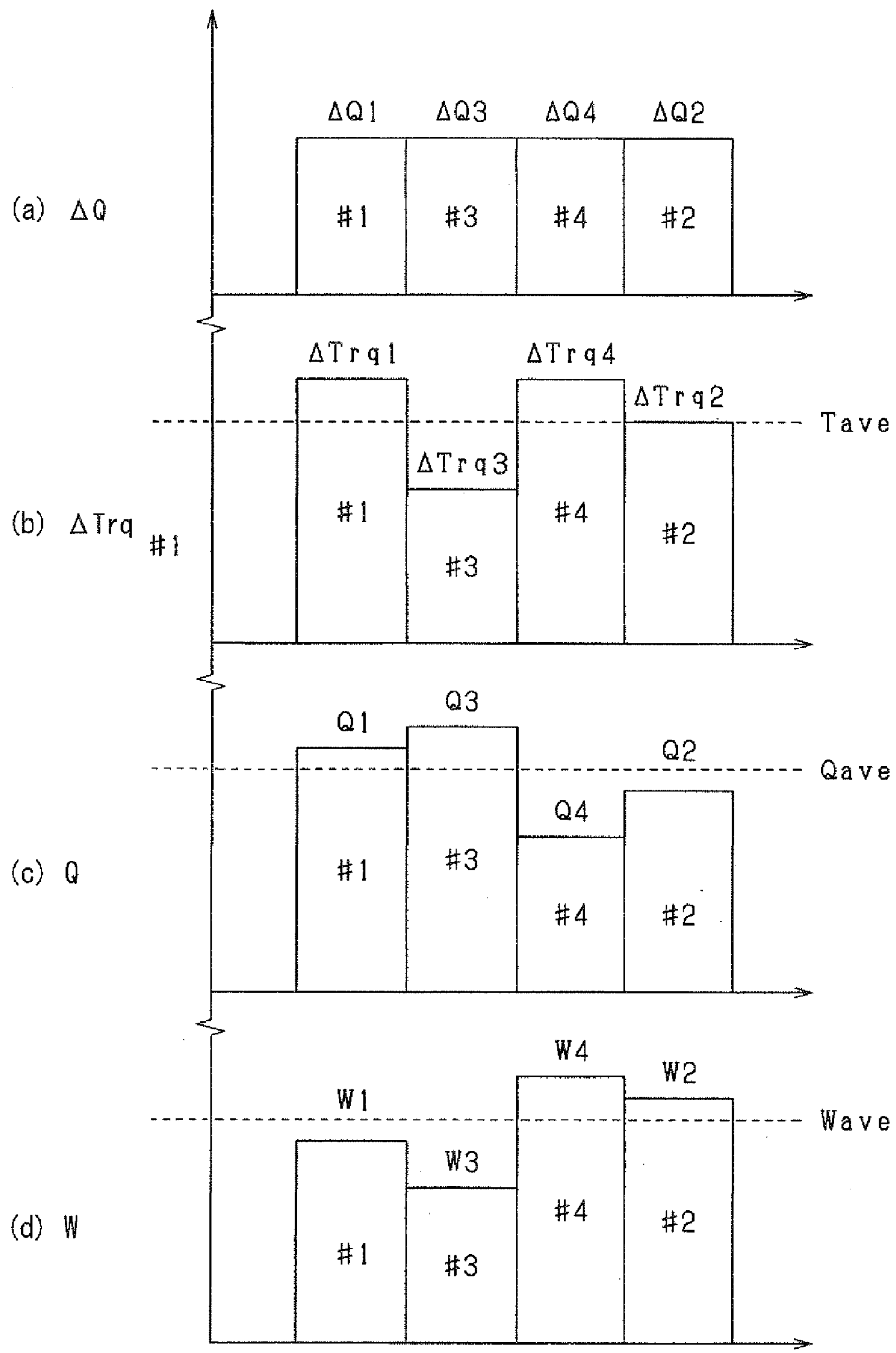
FIG. 9 is a diagram showing an injection quantity variation and a torque increase amount variation obtained by the processing of FIG. 6, an injection quantity variation after FCCB correction according to the first embodiment, and a work amount variation according to a second embodiment of the present invention.

Part (a) of FIG. 9 shows the injection quantities ΔQ1, ΔQ3, ΔQ4 and ΔQ2 of the respective cylinders calculated in S26 in the order of the small injections performed in S22. Part (b) of FIG. 9 shows the torque increase amounts ΔTrq1, ΔTrq3, ΔTrq4 and ΔTrq2 of the respective cylinders calculated in S25 in the order of the small injections performed in S22.

In the present embodiment, the small injections in S22 are performed such that the injection quantities of all the cylinders coincide with each other. Therefore, as shown in part (a) of FIG. 9, the injection quantity variation is not caused but the injection quantities are equalized. Therefore, the variation in the torque increase amount among the cylinders shown in part (b) of FIG. 9 (i.e., the torque increase amount variation) is free from influence of the injection quantity variation and can be specified as the variation caused by the difference in the characteristics of the respective cylinders. Therefore, the torque increase amount variation can be calculated as the cylinder characteristic variation.

Moreover, the small injections in S22 are performed in a state where the EGR quantity is brought to zero by fully closing the EGR valve 52*a* in S21. Therefore, the torque increase amount variation shown in part (b) of FIG. 9 is free from influence of the EGR distribution variation (shown by the solid line L1 in FIG. 5). It can be determined that the element of the EGR distribution variation is eliminated from the cylinder characteristic variation calculated as described above.

Therefore, in S28 (a cylinder characteristic variation calculating section), the cylinder characteristic variation is calculated based on the actual output torque increase amounts ΔTrq1 to ΔTrq4 calculated in S25. The calculation result in S28 is treated as the calculation result, from which the element of the EGR distribution variation is eliminated.

More specifically, an average value Tave of the torque increase amounts ΔTrq1 to ΔTrq4 of the respective cylinders is calculated as a reference value. Then, variation amounts as deviations of the respective torque increase amounts ΔTrq1 to ΔTrq4 from the average value Tave are calculated as variation amounts of the respective torque increase amounts ΔTrq1 to ΔTrq4. For example, the variation amount of the first cylinder #1 is ΔTrq 1 minus Tave. The variation amounts calculated for the respective cylinders are expressed as characteristic values of the respective cylinders. When the variation amount (the characteristic value) is plus, it is determined that the characteristic of the corresponding cylinder (the cylinders #1 and #4 in the example shown in part (b) of FIG. 9) is a characteristic with ignitability better than the reference characteristic. When the variation amount is minus, it is determined that the characteristic of the corresponding cylinder (the cylinder #3 in the example shown in part (b) of FIG. 9) is a characteristic with the ignitability worse than the reference characteristic.

When the small injection is performed in a state where the injection quantities of the respective cylinders are equalized as in the present embodiment, the processing of S24 and S26 may be omitted. However, in this case, it is required to perform learning (referred to as injection quantity learning hereinafter) for calculating the actual injection quantity with respect to the injection command value set in S12 of FIG. 3 based on the sensed pressure P of the fuel pressure sensor 20*a* as shown in FIG. 8 and for changing and storing data of the injection control map M based on a deviation of the calculated actual injection quantity from the command injection quantity commanded with the injection command value. It is because it can be guaranteed that the injection quantities of the respective cylinders are equalized by performing the injection quantity learning.

That is, if the injection quantity learning is performed, the variation in the injection quantity among the cylinders (the injection quantity variation) caused by the individual differences and the aging degradation of the injectors 20 and the like are smoothed. It is preferable to change the injection pattern (the number of injection stages, injection timing and injection quantity of each of the injections, and the like) of the data in the map M (for example, data D1 shown in FIG. 4) corresponding to the various conditions as of the injection (for example, the engine rotation speed NE, the injection quantity Q, the number (#1 to #4) of the injector 20 and environmental conditions such as the engine coolant temperature) to achieve desired output torque and emission state when the injection quantity learning is performed.

In following S29, learning is performed by changing and storing the data (the injection pattern) stored in the injection control map M described above and shown in FIG. 4 based on the cylinder characteristic variation calculated in S28. More specifically, the injection pattern (the number of injection stages, injection timing and injection quantity of each of the injections, and the like) of the data in the map M corresponding to the various conditions as of the small injection (for example, the engine rotation speed NE, the small injection quantity ΔQ, the number (#1 to #4) of the injector 20 and environmental conditions such as the engine coolant temperature) is changed to achieve desired output torque and emission state.

In the case of the torque variation (the cylinder characteristic variation) shown in part (b) of FIG. 9) it is determined that the characteristic of each of the cylinders #1 and #4 is a characteristic with good ignitability. Therefore, in this case, all of the data in the map M corresponding to the cylinders #1 and #4 should be preferably changed to inhibit the combustion and learned. For example, the data may be changed to delay the injection start timing of the pilot injection or the main injection.

It is determined that the characteristic of the cylinder #3 is a characteristic with bad ignitability. Therefore, in this case, all of the data in the map M corresponding to the cylinder #3 should be preferably changed to promote the combustion and learned. For example, the data may be changed to advance the injection start timing of the pilot injection or the main injection. The variation amount of the second cylinder #2 with respect to the average value Tave is zero. Accordingly, the change in S29 is not performed in the map M corresponding to the cylinder #2.

Next, details of the processing of FIG. 10 will be explained. In a series of the processing, first in S30, it is determined whether a learning condition is satisfied. The learning condition is satisfied when the accelerator is not operated, the vehicle running is stopped, and the engine is in an idling operation state of operating the engine at the minimum rotation speed, at which the engine stall does not occur, for example. When it is determined that the learning condition is satisfied (S30: YES), the process proceeds to S31 to perform the FCCB correction explained below.

Figure 11:
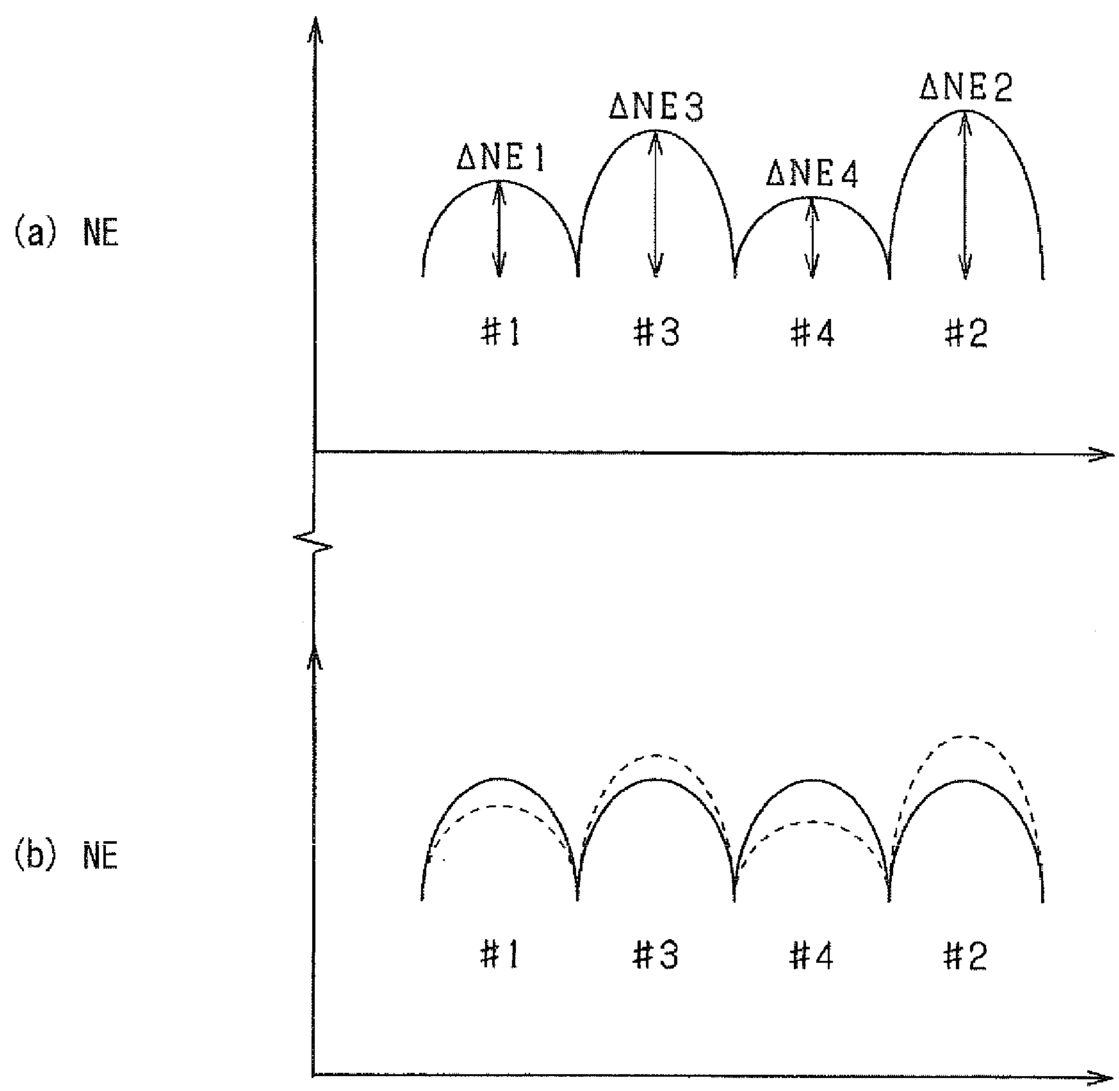
FIG. 11 is a time chart showing rotation fluctuations of cylinders according to the first embodiment.

Next, the FCCB correction will be explained with reference to FIG. 11. Part (a) of FIG. 11 shows rotation fluctuations of the respective cylinders at the time when the FCCB correction is not performed. Part (b) of FIG. 11 shows rotation fluctuations of the respective cylinders at the time when the FCCB correction is performed. The rotation fluctuations shown in part (a) of FIG. 11 are shown by broken lines in part (b) of FIG. 11.

As shown in part (a) of FIG. 11, rotation increase and rotation decrease occur repeatedly in each of the respective cylinders #1 to #4. The rotation fluctuation varies among the cylinders as shown in part (a) of FIG. 11. In this case, the rotation fluctuation amounts of the respective cylinders #1 to #4 are represented by signs ΔNE1, ΔNE2, ΔNE3 and ΔNE4 respectively. By applying the FCCB correction to the fuel injection quantities of the respective cylinders, the rotation fluctuation amounts are smoothed to be substantially equal to each other as shown in part (b) of FIG. 11. In this case, in practice, differences between an average value of the rotation fluctuation amounts ΔNE1 to ΔNE4 of all the cylinders and the rotation fluctuation amounts ΔNE1 to ΔNE4 of the respective cylinders are calculated, and the FCCB correction values are calculated based on the differences.

In following S32 (an injection quantity sensing section), fluctuation of the inlet pressure P (refer to part (c) of FIG. 8) caused in connection with the injection of the quantity corrected by the FCCB correction is sensed with the fuel pressure sensor 20*a*. The sensing is performed by subroutine processing separate from the processing of FIG. 10 like S24 of FIG. 6.

In following S33, injection quantities Q1 to Q4 after the FCCB correction are calculated for the respective cylinders based on the fluctuation of the inlet pressure P sensed in S32. The calculating method is the same as S26 of FIG. 6. For example, the change of the injection rate R shown in part (b)

of FIG. 8 is estimated from the fluctuation of the inlet pressure P shown in part (c) of FIG. 8. Then, an area of the shaded portion shown in part (b) of FIG. 8 out of the estimated injection rate change is calculated as the injection quantity Q1. Thus, as shown in part (c) of FIG. 9, the injection quantity variation after the FCCB correction can be obtained.

If the rotation fluctuation amounts are smoothed to be substantially equal to each other by the FCCB correction, it can be said that the output torque values of the respective cylinders are equalized to each other. Therefore, it can be said that the injection quantity variation caused in the state where the output torque values are equalized is caused by the EGR distribution variation and the cylinder characteristic variation. That is, it can be said that the injection quantity variation shown in part (c) of FIG. 9 is the summation of the element of the EGR distribution variation and the element of the cylinder characteristic variation.

For example, an average value Qave of the injection quantities Q1 to Q4 of the respective cylinders is calculated as a reference value. Then, variation amounts as deviations of the injection quantities Q1 to Q4 from the average value Qave are calculated. For example, a variation amount of the first cylinder #1 is Q1 minus Qave. The variation amount calculated for each cylinder is expressed as the summation of the EGR distribution variation and the cylinder characteristic variation of the cylinder. When the variation amount is plus, it is determined that the characteristic of the corresponding cylinder (cylinders #1 and #3 in the example shown in part (c) of FIG. 9) is a characteristic with ignitability worse than a reference characteristic. When the variation amount is minus, it is determined that the characteristic of the corresponding cylinder (cylinders #4 and #2 in the example shown in part (c) of FIG. 9) is a characteristic with ignitability better than the reference characteristic.

As mentioned above, the element of the EGR distribution variation is eliminated from the torque variation (the cylinder characteristic variation) shown in part (b) of FIG. 9 calculated in S28 of FIG. 6. In view of this point, in following S34 (an EGR distribution variation calculating section), the EGR distribution variation is calculated by subtracting the cylinder characteristic variation, which is calculated in S28 and shown in part (b) of FIG. 9, from the injection quantity variation (i.e., the summation of the EGR distribution variation and the cylinder characteristic variation) calculated in S33 and shown in part (c) of FIG. 9.

In following S35 (an injection mode correcting section, a learning section), learning is performed by changing and storing the data (the injection pattern) stored in the injection control map M described above and shown in FIG. 4 based on the EGR distribution variation calculated in S34. More specifically, the injection pattern (the number of injection stages, injection timing and injection quantity of each of the injections, and the like) in the data in the map M corresponding to the various conditions as of the FCCB correction (for example, the engine rotation speed NE, the injection quantity Q, the number (#1 to #4) of the injector 20 and environmental conditions such as the engine coolant temperature) is changed to achieve desired output torque and emission state.

In the present embodiment, the data in the map M are changed and learned to smooth (reduce) the calculated EGR distribution variation. The data in the map M are corrected and learned based on the calculated EGR distribution variation such that the injection start timing of the pilot injection or the main injection is advanced in the cylinder, the EGR distribution quantity of which is relatively large, and such that the injection start timing of the pilot injection or the main injection is delayed in the cylinder, the EGR distribution quantity of which is relatively small.

The present embodiment described above exerts following effects.

(1) The rotation fluctuation amounts ΔNE1 to ΔNE4 equivalent to the instantaneous torque values are sensed for the respective cylinders, the FCCB correction is performed to equally smooth the rotation fluctuation amounts ΔNE1 to ΔNE4, and the injection quantities Q1 to Q4 after the FCCB correction are sensed for the respective cylinders (in S32, S33). The variation in the sensed injection quantities Q1 to Q4 is caused in the state where the rotation fluctuation amounts (output torque values) are equalized to each other by the FCCB correction. Therefore, it can be said that variation in the sensed injection quantities Q1 to Q4 substantially reflect the EGR distribution variation.

Therefore, the variation in the injection quantities Q1 to Q4 shown in part (c) of FIG. 9 can be calculated as the EGR distribution variation (in S34). The data of the injection control map M are learned in accordance with the calculated EGR distribution variation (in S35). Accordingly, the output torque and the emission state of the internal combustion engine can be controlled with high accuracy.

(2) The cylinder characteristic variation shown in part (b) of FIG. 9, from which the elements of the EGR distribution variation and the injection quantity variation are removed, is calculated (in S28) by the processing of the small injection shown in FIG. 6 separately from the processing of the FCCB correction shown in FIG. 10. The EGR distribution variation is calculated (corrected) by subtracting the cylinder characteristic variation (shown in part (b) of FIG. 9) from the variation in the above-mentioned injection quantities Q1 to Q4 (shown in part (c) of FIG. 9). Therefore, the element of the cylinder characteristic variation is eliminated from the EGR distribution variation calculated from the variation in the injection quantities Q1 to Q4 after the FCCB correction. As a result, the EGR distribution variation can be obtained with high accuracy.

(3) The output torque is increased by the small injection in the small injection processing shown in FIG. 6, and the torque increase amounts ΔTrq1 to ΔTrq4 and the small injection quantities ΔQ1 to ΔQ4 at that time are sensed (in S23, S24). The small injection is performed so that the injection quantities of all the cylinders are equalized to each other (in S22). Therefore, it can be determined that the variation in the torque increase amount among the cylinders shown in part (b) of FIG. 9 is not caused by the injection quantity variation but is caused by the difference in the characteristics of the respective cylinders. Therefore, the torque increase amount variation is calculated as the cylinder characteristic variation (in S28). The data of the injection control map M are learned in accordance with the cylinder characteristic variation (the variation amounts) calculated in this way. Accordingly, the fuel injection control can be performed with high accuracy such that the desired output torque and emission state are achieved.

(4) The injection quantities Q1 to Q4 after the FCCB correction substantially reflecting the EGR distribution variation are calculated based on the rotation fluctuation amounts ΔNE1 to ΔNE4 (equivalent to the torque sensing values) and the sensed pressure of the fuel pressure sensor 20*a* (equivalent to the injection quantity sensing values) sensed during the idle operation period, in which the sensing values are less affected by the twisting torque variation. Therefore, a degree of inclusion of the twisting torque variation element in the calculation result of the EGR distribution variation in S34 can be reduced. As a result, the EGR distribution variation can be obtained with high accuracy.

(5) When the small injection is performed in S21, the small injections in the respective cylinders are performed in succession during the same deceleration period. Accordingly, the torque increase amount variation (the cylinder characteristic variation) can be calculated in a state where the various conditions such as the fuel temperature as of the small injection are equalized among all the cylinders. As a result, the cylinder characteristic variation shown in part (b) of FIG. 9 can be obtained with high accuracy and eventually the EGR distribution variation can be obtained with high accuracy.

(6) Even if the opening degree setting of the EGR valve 52*a* or the throttle valve 51*a* is to be changed in accordance with the EGR distribution variation calculated in S34, the change (the learning) corresponding to the characteristic of each cylinder cannot be performed because the recirculated exhaust gas quantity and the fresh air quantity are distributed to the respective cylinders #1 to #4 by the intake manifold 51*m*. As contrasted thereto, in the present embodiment, the injection start timing is changed and learned in accordance with the EGR distribution variation calculated in S34. Therefore, the map for each cylinder can be changed and learned in accordance with the characteristic of each cylinder.

(7) The average value Qave of the injection quantities Q1 to Q4 of the respective cylinders after the FCCB correction (that is, the average value of the EGR distribution quantities of the respective cylinders) is calculated as the reference value. The variation amounts as the deviations of the injection quantities Q1 to Q4 from the average value Qave are calculated as the EGR distribution variation amounts of the respective cylinders. Therefore, it is unnecessary to set the reference value by adaptation or the like, thereby reducing the calculation processing burden of the EGR distribution variation.

(8) The fuel pressure sensor 20*a* is arranged to be closer to the injection holes 20*f* than the common rail 12. Accordingly, the fuel pressure fluctuation caused in connection with the small injection from the injection holes 20*f* can be sensed with high accuracy. Therefore, the change of the injection rate can be calculated with high accuracy from the sensed fuel pressure fluctuation and eventually the actual injection quantities ΔQ1 to ΔQ4 and Q1 to Q4 can be calculated in S26 and S33 with high accuracy. As a result, the EGR distribution variation can be obtained with high accuracy.

According to the present embodiment, the fuel pressure sensor 20*a* is fixed to the injector 20. Therefore, the fixing position of the fuel pressure sensor 20*a* is closer to the injection holes 20*f* than in the case where the fuel pressure sensor 20*a* is fixed to the high-pressure pipe 14 connecting the common rail 12 with the injector 20. Accordingly, the pressure fluctuation in the injection holes 20*f* can be sensed more appropriately than in the case where the pressure fluctuation is sensed after the pressure fluctuation in the injection holes 20*f* attenuates in the high-pressure pipe 14.

Next, a second embodiment of the present invention will be explained. As the method of calculating the cylinder characteristic variation, from which the element of the EGR distribution variation is removed, the above-described first embodiment adopts the method of calculating the above-described cylinder characteristic variation based on the torque sensing values and the injection quantity sensing values sensed when the small injections are performed in the idle operation period as shown in FIG. 6. In contrast, the second embodiment adopts a method of calculating the cylinder characteristic variation, from which the element of the EGR distribution variation is removed, based on the torque sensing values and the injection quantity sensing values sensed during normal running of the vehicle.

Hereafter, contents of processing according to the present embodiment will be explained with reference to part (d) of FIG. 9 and FIG. 12, focusing on differences from FIG. 10 of the first embodiment.

S30 of FIG. 10 uses the state where the idle operation is in progress as the learning condition. In the present embodiment, in addition to the case where the idle operation is in progress, the learning condition is determined to be satisfied when the normal running is in progress without causing an abnormal condition such as an overrunning condition. Then, the injection quantities are equalized such that the injection quantities (each of which is equivalent to the area of the shaded portion shown in part (b) of FIG. 8) calculated based on the sensed pressure of the fuel pressure sensors 20*a* coincide with each other among the respective cylinders (by an injection controlling section). The EGR quantity is brought to zero by fully closing the EGR valve 52*a*.

Figure 12:
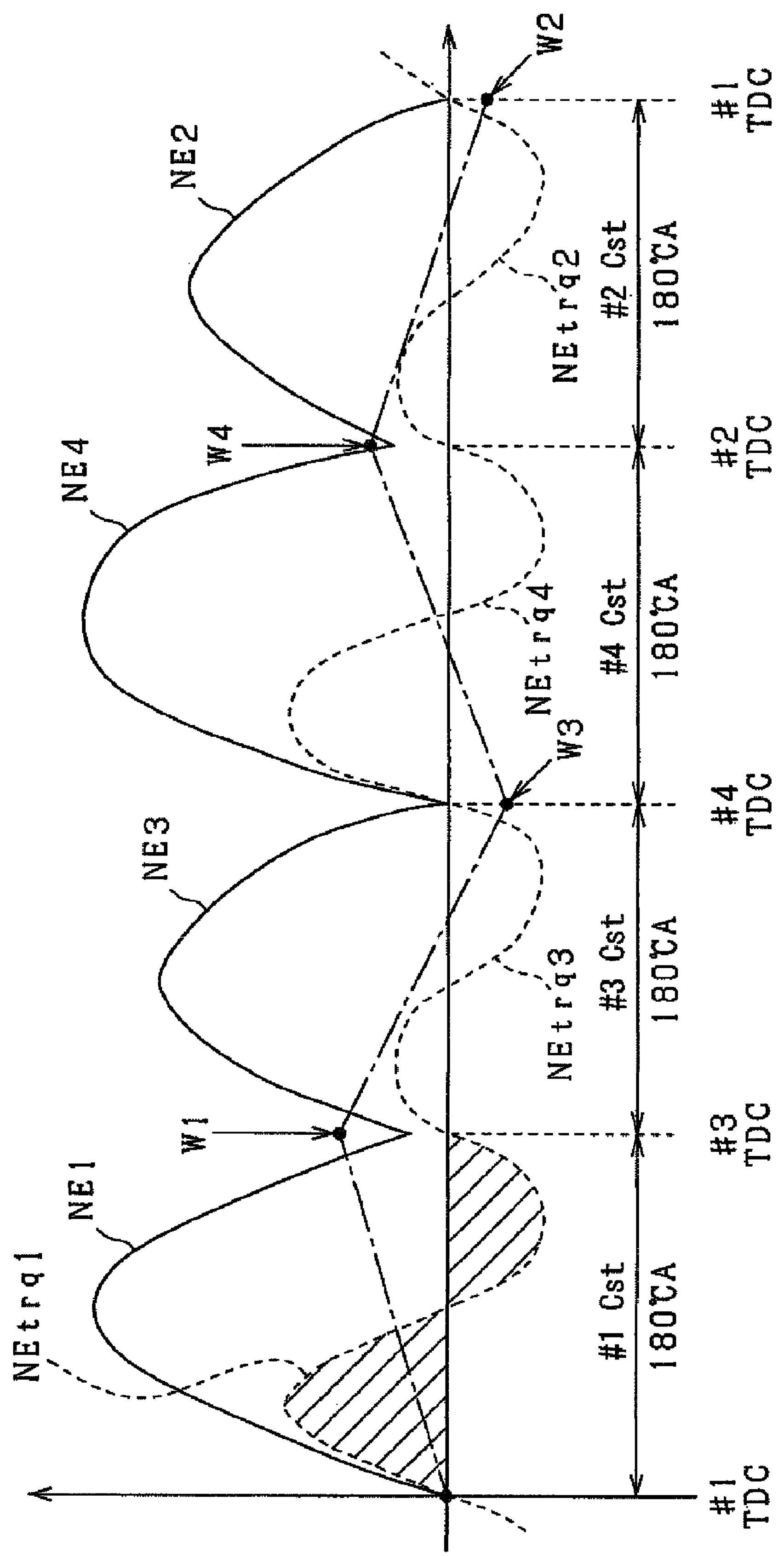
FIG. 12 is a time chart showing changes of rotation speeds, instantaneous torque equivalents, and work amounts of cylinders according to the second embodiment.

Then, processing for sensing the rotation speeds NE1, NE2, NE3 and NE4 corresponding to the cylinders #1 to #4 shown by a solid line in FIG. 12 is performed like the sensing processing of the rotation fluctuation amounts ΔNE1 ΔNE2, ΔNE3 and ΔNE4 corresponding to the respective cylinders #1 to #4 performed in S31. The rotation speeds NE1 to NE4 are sensed when the injection quantities are equalized and the EGR quantity is zero as mentioned above. Therefore, such the states of the injection quantities and the EGR may be realized only during the sensing period of the rotation speeds NE1 to NE4. The FCCB correction corresponding to the variation in the rotation speeds NE1 to NE4 is not performed here.

The processing of S32 to S34 of FIG. 10 according to the first embodiment is changed in the present embodiment as follows. First, differential operation of the rotation speeds NE1 to NE4 sensed as mentioned above is performed. Broken lines NEtrq1, NEtrq2, NEtrq3 and NEtrq4 in FIG. 12 show the results of the differential operation The differential values are equivalent to instantaneous torque values of the respective cylinders.

Then, integration operation of the instantaneous torque equivalents NEtrq1 to NEtrq4 is performed for the respective cylinders. An integration range is a degree of the crank angle corresponding to the combustion stroke (indicated by "Cst" in FIG. 12) of each cylinder (i.e., 180° CA). The integration operation should be preferably performed in synchronization with the degree of the crank angle. An area of a shaded portion in FIG. 12 shows the result of the integration operation of the instantaneous torque equivalent NEtrq1 of the cylinder #1. The integration values of the respective cylinders are equivalent to work amounts W1, W2, W3 and W4 of the respective cylinders. Part (d) of FIG. 9 shows a variation in the work amounts W1 to W4.

Since the rotation fluctuation amounts have been smoothed substantially equally by the FCCB correction, it can be said that the variation in the work amounts W1 to W4 caused in the state where the injection quantities are equalized is caused by the EGR distribution variation and the cylinder characteristic variation. That is, it can be said that the variation in the work amounts W1 to W4 shown in part (d) of FIG. 9 is the summation of the element of the EGR distribution variation and the element of the cylinder characteristic variation.

As mentioned above, the element of the EGR distribution variation is eliminated from the torque variation (the cylinder characteristic variation) shown in part (b) of FIG. 9 calculated in S28 of FIG. 6. Therefore, the EGR distribution variation is calculated by subtracting the cylinder characteristic variation, which is calculated in S28 and shown in part (b) of FIG. 9, from the variation in the work amounts W1 to W4 (i.e., the summation of the EGR distribution variation and the cylinder characteristic variation) shown in part (d) of FIG. 9.

Then, like S35 of FIG. 10, learning is performed by changing and storing the data (the injection pattern) stored in the injection control map M described above and shown in FIG. 4 based on the EGR distribution variation calculated as described above.

In the present embodiment, an average value Wave of the work amounts W1 to W4 of the respective cylinders is calculated as a reference value, and variation amounts as deviations of the work amounts W1 to W4 from the average value Wave are calculated. For example, the variation amount of the first cylinder #1 is W1 minus Wave. The variation amount calculated for each cylinder is expressed as the summation of the EGR distribution variation and the cylinder characteristic variation of the cylinder. When the variation amount is plus, it is determined that the characteristic of the corresponding cylinder (cylinders #4 and #2 in the example shown in part (d) of FIG. 9) is a characteristic with ignitability better than a reference characteristic. When the variation amount is minus, it is determined that the characteristic of the corresponding cylinder (cylinders #1 and #3 in the example shown in part (d) of FIG. 9) is a characteristic with ignitability worse than the reference characteristic.

In the above-described first embodiment, the EGR distribution variation is calculated based on the rotation fluctuation amounts ΔNE1 to ΔNE4 (equivalent to the torque sensing values) and the sensed pressure of the fuel pressure sensors 20*a* (equivalent to the injection quantity sensing values) sensed during the idle operation period, in which the sensing values are less affected by the twisting torque variation. In contrast, in the present embodiment, the EGR distribution variation is calculated based on the rotation speeds NE1 to NE4 (equivalent to the torque sensing values) and the sensed pressure of the fuel pressure sensors 20*a* (equivalent to the injection quantity sensing values) sensed during the normal running. Therefore, there is a concern that the sensing values are affected by the twisting torque variation.

Therefore, in the present embodiment, values (nominal values) equivalent to the twisting torque values caused in the respective cylinders are stored in the map beforehand, and correction is performed by subtracting the nominal values from the respective work amounts W1 to W4. With such the construction, the calculated EGR distribution variation can be inhibited from including the element of the twisting torque variation. When the above-described nominal values are stored in the map for each cylinder, it is desirable to store the nominal values for each area of the rotation speed and the injection quantity in a distinguished manner.

Thus, effects similar to the various effects of the first embodiment can be exerted also with the present embodiment. In the first embodiment, the calculation result of the EGR distribution variation in S34 is obtained only for the low rotation speed of the idle operation. Therefore, only the area in the map M corresponding to the rotation speed range of the idle operation can be corrected (learned). In contrast, according to the present embodiment, the EGR distribution variation can be calculated not only during the idle operation but also during the normal running. That is, the EGR distribution variation can be calculated in a wide range of the engine rotation speed. Therefore, the map M can be corrected (learned) in a wide range.

The above described embodiments may be modified and implemented as follows, for example. Moreover, the present invention is not limited to the above-described embodiments. Characteristic control contents of the respective embodiments may be combined arbitrarily.

In the above-described embodiments, the small injection control in S22 of FIG. 6 is performed during the no-injection running. That is, S20 sets the state where the no-injection running is in progress as the learning condition. Alternatively, the condition that the no-injection running is in progress may be abolished and the small injection control in S22 may be performed during the injection running.

In this case, a small quantity beforehand set regardless of the accelerator operation amount ACCP is added to an injection quantity, which is calculated based on the accelerator operation amount ACCP by the driver, the engine rotation speed NE and the like. The fuel of the quantity increased by the small quantity in this way is injected in S22. Then, in S23, an increase amount from the engine rotation speed corresponding to the injection quantity before the increase of the injection quantity to the engine rotation speed corresponding to the injection quantity after the increase is sensed. The processing from S24 may be performed by regarding the thus-sensed increase amount as the rotation increase amount Δω (refer to part (b) of FIG. 7) accompanying the small injection.

In the above-described embodiments, the injection start timing is changed and learned in accordance with the EGR distribution variation. Alternatively, in addition to or in place of the injection start timing, the injection mode such as the injection quantity or the injection stage number in the case of the multi-stage injection may be changed and learned, for example.

In the above-described embodiments, the data of the map M of FIG. 4 are changed using the cylinder characteristic variation calculated by the processing of FIG. 6 as it is. Alternatively, multiple times of the small injections may be performed under the same conditions such as the engine rotation speed NE, and integration average of values of the cylinder characteristic variation calculated for the respective small injections may be performed. Then, the data of the map M of FIG. 4 may be changed using the cylinder characteristic variation obtained through the integration average. With such the construction, as compared to the case where the data change of the map M is performed using the calculation result of the cylinder characteristic variation obtained by the single fuel injection in each cylinder as it is, the influence of the sensing errors concerning the torque increase amount sensing in S22 and the injection quantity sensing in S23 can be reduced. As a result, the map M less affected by the sensing errors can be obtained.

Likewise, a series of calculation processing of the EGR distribution variation by S31 to S34 may be performed multiple times, and the data of the map M of FIG. 4 may be changed using the EGR distribution variation obtained by averaging the calculation results. Also with such the construction, the influence of the sensing error can be reduced. As a result, the map M less affected by the sensing error can be obtained.

In the above-described embodiments, the small injection quantities of the respective cylinders are equalized when performing the small injection in S21. Thus, the cylinder characteristic variation is calculated based on the torque increase amount variation in a state where the injection quantity variation is brought to zero, Alternatively, the processing of FIG. 6 may be Performed without equalizing the small injection quantities. In this case, the values of the injection quantities ΔQ1 to ΔQ4 of the respective cylinders vary unlike part (a) of FIG. 9. However, the cylinder characteristic variation can be calculated based on the injection quantity variation and the torque increase amount variation shown in part (b) of FIG. 9.

For example, a ratio of the torque increase amount ΔTrq1 to the injection quantity ΔQ1 may be calculated for each cylinder as a cylinder characteristic value, and a variation in the calculated cylinder characteristic value among the cylinders may be calculated as the cylinder characteristic variation. Alternatively, a torque increase amount converted from the injection quantity ΔQ1 may be calculated, and a deviation of the converted torque increase amount from the torque increase amount ΔTrq1 calculated in S24 may be calculated as a cylinder characteristic value for each cylinder. A variation in the calculated cylinder characteristic value among the cylinders may be calculated as the cylinder characteristic variation.

In order to fix the fuel pressure sensor 20*a* to the injector 20, in the above-described embodiments, the fuel pressure sensor 20*a* is fixed to the fuel inlet 22 of the injector 20. Alternatively, as shown by a chained line 200*a* in FIG. 2, a pressure sensor 200*a* may be mounted inside the housing 20*e* to sense fuel pressure in an internal fuel passage 25 extending from the fuel inlet 22 to the injection holes 20*f*.

The fixing structure of the fuel pressure sensor 20*a* can be simplified in the case where the fuel pressure sensor 20*a* is fixed to the fuel inlet 22 as described above as compared with the case where the fuel pressure sensor 200*a* is mounted inside the housing 20*e*. When the fuel pressure sensor 200*a* is mounted inside the housing 20*e*, the fixing position of the fuel pressure sensor 200*a* is closer to the injection holes 20*f* than in the case where the fuel pressure sensor 20*a* is fixed to the fuel inlet 22. Therefore, the pressure fluctuation in the injection holes 20*f* can be sensed more appropriately.

The fuel pressure sensor 20*a* may be fixed to the high-pressure pipe 14. In this case, it is preferable to fix the fuel pressure sensor 20*a* to a position distanced from the common rail 12 by a predetermined distance.

A flow rate restricting section may be provided between the common rail 12 and the high-pressure pipe 14 for restricting a flow rate of the fuel flowing from the common rail 12 to the high-pressure pipe 14. The flow rate restricting section functions to block the flow passage when an excess fuel outflow is caused by fuel leakage due to a damage to the high-pressure pipe 14, the injector 20 or the like. For example, the flow rate restricting section may be constituted of a valve member such as a ball that blocks the flow passage when the excess flow rate occurs. Alternatively, a flow damper constituted by integrally combining the orifice 12*a* (the fuel pulsation reducing section) and the flow rate restricting section may be adopted.

In place of the construction of arranging the fuel pressure sensor 20*a* downstream of the orifice and the flow rate restricting section with respect to the fuel flow direction, the fuel pressure sensor 20*a* may be arranged downstream of at least one of the orifice and the flow rate restricting section.

An arbitrary number of the fuel pressure sensor(s) 20*a* may be used. For example, two or more sensors 20*a* may be provided to the fuel flow passage of one cylinder, A rail pressure sensor for sensing the pressure in the common rail 12 may be provided in addition to the above-described fuel pressure sensor 20*a*.

In place of the electromagnetic drive injector 20 shown in FIG. 2, a piezo drive injector may be used. Alternatively an injector that does not cause pressure leak from the leak hole 24 and the like such as a direct acting injector that transmits the drive power not through the oil pressure chamber Cd (for example, a direct acting piezo injector having been developed in recent years) can be also used. In the case where the direct acting injector is used, control of the injection rate is facilitated.

The kind and the system configuration of the engine as the control target can also be arbitrarily modified in accordance with the use and the like. In the above-described embodiments, the present invention is applied to the diesel engine as an example. For example, the present invention can be also applied to a spark ignition gasoline engine (specifically, a direct-injection engine) or the like basically in the similar way. For example, a fuel injection system of a direct injection gasoline engine generally has a delivery pipe that stores fuel (gasoline) in a high-pressure state. In the system, the fuel is pumped from a fuel pump to the delivery pipe, and the high-pressure fuel in the delivery pipe is distributed to multiple injectors 20 and injected and supplied into engine combustion chambers. In this system, the delivery pipe corresponds to the pressure accumulator The device and the system according to the present invention can be applied not only to the injector that injects the fuel directly into the cylinder but also to an injector that injects the fuel to an intake passage or an exhaust passage of the engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An exhaust gas recirculation distribution variation sensing device for a multi-cylinder internal combustion engine having a plurality of cylinders and a plurality of injectors respectively provided to the cylinders, the internal combustion engine being structured to distribute recirculated exhaust gas, which is recirculated from an exhaust system to an intake system, to the respective cylinders, the exhaust gas recirculation distribution variation sensing device comprising:

- a torque sensing means for sensing instantaneous torque caused with combustion of fuel injected from the injector or a physical quantity relevant to the instantaneous torque for each cylinder;
- an injection quantity sensing means for sensing an actual injection quantity of the injected fuel or a physical quantity relevant to the injection quantity for each cylinder; and
- an exhaust gas recirculation distribution variation calculating means for calculating an exhaust gas recirculation distribution variation based on a variation in the torque sensing value of the torque sensing means among the cylinders and a variation in the injection quantity sensing value of the injection quantity sensing means among the cylinders, wherein the exhaust gas recirculation distribution is a variation among inflow quantities of the recirculated exhaust gas flowing into the respective cylinders at the time when the recirculated exhaust gas is lead from an intake passage of the engine and flows into the respective cylinders.

2. The exhaust gas recirculation distribution variation sensing device as in claim 1, further comprising:

- an injection controlling means for injecting the same quantity of the fuel sequentially into the respective cylinders such that the injection quantity sensing values of all the cylinders coincide with each other, wherein
- the torque sensing means senses instantaneous torque caused with combustion of the fuel injected by the injection controlling means or a physical quantity relevant to the instantaneous torque for each cylinder, and the exhaust gas recirculation distribution variation calculating means calculates the exhaust gas recirculation distribution variation while bringing the variation in the injection quantity sensing value of the injection quantity sensing means among the cylinders to zero.

3. The exhaust gas recirculation distribution variation sensing device as in claim 1, wherein the exhaust gas recirculation distribution variation calculating means calculates the exhaust gas recirculation distribution variation based on the torque sensing value and the injection quantity sensing value sensed during an idle operation of a vehicle, in which the internal combustion engine is mounted.

4. The exhaust gas recirculation distribution variation sensing device as in claim 1, wherein the exhaust gas recirculation distribution variation calculating means calculates the exhaust gas recirculation distribution variation based on the torque sensing value and the injection quantity sensing value sensed during normal running of a vehicle, in which the internal combustion engine is mounted.

5. The exhaust gas recirculation distribution variation sensing device as in claim 1, further comprising:

a learning means for storing the exhaust gas recirculation distribution variation in a map defining a relationship between the exhaust gas recirculation distribution variation and an operation state of the internal combustion engine.

6. The exhaust gas recirculation distribution variation sensing device as in claim 1, further comprising:

an injection mode correcting means for correcting an injection mode of the fuel injected from the injector of each cylinder in accordance with the exhaust gas recirculation distribution variation.

7. The exhaust gas recirculation distribution variation sensing device as in claim 6, wherein the injection mode correcting means corrects the injection mode based on the exhaust gas recirculation distribution variation to advance injection start timing of the cylinder, a calculated exhaust gas recirculation distribution quantity of which is relatively large, and to delay the injection start timing of the cylinder, a calculated exhaust gas recirculation distribution quantity of which is relatively small.

8. The exhaust gas recirculation distribution variation sensing device as in claim 1, wherein the internal combustion engine is structured to distribute and supply the fuel from a pressure accumulator, which accumulates the fuel, to the injectors, and the injection quantity sensing means is a fuel pressure sensor for sensing pressure of the fuel supplied to the injector as the physical quantity and is arranged in a fuel passage, which extends from the pressure accumulator to an injection hole of the injector, at a position closer to the injection hole than the pressure accumulator.

9. The exhaust gas recirculation distribution variation sensing device as in claim 8, wherein the fuel pressure sensor is fixed to the injector.

10. The exhaust gas recirculation distribution variation sensing device as in claim 9, wherein the fuel pressure sensor is fixed to a fuel inlet of the injector.

11. The exhaust gas recirculation distribution variation sensing device as in claim 9, wherein the fuel pressure sensor is mounted inside the injector to sense fuel pressure in an internal fuel passage extending from a fuel inlet of the injector to the injection hole of the injector.

12. The exhaust gas recirculation distribution variation sensing device as in claim 8, wherein an orifice is provided in a fuel passage, which extends from the pressure accumulator to a fuel inlet of the injector, for attenuating a pressure pulsation of the fuel in the pressure accumulator, and the fuel pressure sensor is arranged downstream of the orifice with respect to a fuel flow direction.

13. The exhaust gas recirculation distribution variation sensing device as in claim 1, wherein the torque sensing means is a rotation speed sensor for sensing rotation speed of an output shaft of the internal combustion engine as the physical quantity.

14. An exhaust gas recirculation distribution variation sensing device for a multi-cylinder internal combustion engine having a plurality of cylinders and a plurality of injectors respectively provided to the cylinders, the internal combustion engine being structured to distribute recirculated exhaust gas, which is recirculated from an exhaust system to an intake system, to the respective cylinders, the exhaust gas recirculation distribution variation sensing device comprising:

a torque sensing means for sensing instantaneous torque caused with combustion of fuel injected from the injector or a physical quantity relevant to the instantaneous torque for each cylinder;

an injection quantity sensing means for sensing an actual injection quantity of the injected fuel or a physical quantity relevant to the injection quantity for each cylinder; and an exhaust gas recirculation distribution variation calculating means for calculating an exhaust gas recirculation distribution variation as distribution variation of the recirculated gas to the respective cylinders based on a variation in the torque sensing value of the torque sensing means among the cylinders and a variation in the injection quantity sensing value of the injection quantity sensing means among the cylinders, wherein the internal combustion engine has an exhaust gas recirculation valve for regulating a quantity of the recirculated exhaust gas, the exhaust gas recirculation distribution variation sensing device further comprising:

a small injection controlling means for performing small injections sequentially in the respective cylinders for injecting a small quantity of fuel from each injector regardless of manipulation, which is performed by a driver to operate the internal combustion engine, in a state where the exhaust gas recirculation valve is fully closed;

a cylinder characteristic variation calculating means for calculating a cylinder characteristic variation as a variation in a cylinder characteristic among the cylinders based on a variation in an actual injection quantity of the small injection or a physical quantity relevant to the injection quantity among the cylinders and a variation in an increase amount of output torque caused in connection with the small injection or a physical quantity relevant to the increase amount among the cylinders; and an exhaust gas recirculation distribution variation correcting means for correcting the exhaust gas recirculation distribution variation by subtracting the cylinder characteristic variation from the exhaust gas recirculation distribution variation.

15. A method of sensing exhaust gas recirculation distribution variation for a multi-cylinder internal combustion engine having a plurality of cylinders and a plurality of injectors respectively provided to the cylinders, the internal combustion engine being structured to distribute recirculated exhaust gas, which is recirculated from an exhaust system to an intake system, to the respective cylinders, the method comprising:

sensing instantaneous torque caused with combustion of fuel injected from the injector or a physical quantity relevant to the instantaneous torque for each cylinder;

sensing an actual injection quantity of the injected fuel or a physical quantity relevant to the injection quantity for each cylinder; and calculating an exhaust gas recirculation distribution variation based on a variation in the torque sensing value among the cylinders and a variation in the injection quantity sensing value among the cylinders, wherein the exhaust gas recirculation distribution is a variation among inflow quantities of the recirculated exhaust gas flowing into the respective cylinders at the time when the recirculated exhaust gas is lead from an intake passage of the engine and flows into the respective cylinders.

16. The method as in claim 15, further comprising:

injecting the same quantity of the fuel sequentially into the respective cylinders such that the injection quantity sensing values of all the cylinders coincide with each other, wherein said sensing instantaneous torque includes sensing instantaneous torque caused with combustion of the injected fuel or a physical quantity relevant to the instantaneous torque for each cylinder, and said calculating an exhaust gas recirculation distribution variation includes calculating the exhaust gas recirculation distribution variation while bringing the variation in the injection quantity sensing value among the cylinders to zero.

17. The method as in claim 15 wherein the internal combustion engine has an exhaust gas recirculation valve for regulating a quantity of the recirculated exhaust gas, and the method further comprises:

performing small injections sequentially in the respective cylinders for injecting a small quantity of fuel from each injector regardless of manipulation, which is performed by a driver to operate the internal combustion engine, in a state where the exhaust gas recirculation valve is fully closed;

calculating a cylinder characteristic variation as a variation in a cylinder characteristic among the cylinders based on a variation in an actual injection quantity of the small injection or a physical quantity relevant to the injection quantity among the cylinders and a variation in an increase amount of output torque caused in connection with the small injection or a physical quantity relevant to the increase amount among the cylinders; and correcting the exhaust gas recirculation distribution variation by subtracting the cylinder characteristic variation from the exhaust gas recirculation distribution variation.

18. The method as in claim 15, wherein said calculating an exhaust gas recirculation distribution variation includes calculating the exhaust gas recirculation distribution variation based on the torque sensing value and the injection quantity sensing value sensed during an idle operation of a vehicle, in which the internal combustion engine is mounted.

19. The method as in claim 15, wherein said calculating an exhaust gas recirculation distribution variation includes calculating the exhaust gas recirculation distribution variation based on the torque sensing value and the injection quantity sensing value sensed during normal running of a vehicle, in which the internal combustion engine is mounted.

20. The method as in claim 15, further comprising:

storing the exhaust gas recirculation distribution variation in a map defining a relationship between the exhaust gas recirculation distribution variation and an operation state of the internal combustion engine.

* * * * *